United States Patent
Soelberg et al.

(10) Patent No.: US 9,911,111 B2
(45) Date of Patent: *Mar. 6, 2018

(54) POINT OF SALE PAIRING

(71) Applicants: AT&T Mobility II, LLC, Atlanta, GA (US); AT&T INTELLECTUAL PROPERTY I, L.P., Atlanta, GA (US)

(72) Inventors: Emily Soelberg, Atlanta, GA (US); Glenn Blumstein, Mercer Island, WA (US); Ginger Chien, Bellevue, WA (US); Murali Narayanan, Redmond, WA (US); Bradley Richard Ree, San Marcos, CA (US); Venson Shaw, Kirkland, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,456

(22) Filed: May 5, 2017

(65) Prior Publication Data
US 2017/0243189 A1 Aug. 24, 2017

Related U.S. Application Data

(63) Continuation of application No. 14/620,318, filed on Feb. 12, 2015, now Pat. No. 9,680,822.

(51) Int. Cl.
*G06Q 20/20* (2012.01)
*G06Q 20/32* (2012.01)
(Continued)

(52) U.S. Cl.
CPC ......... *G06Q 20/206* (2013.01); *G06Q 20/202* (2013.01); *G06Q 40/12* (2013.12);
(Continued)

(58) Field of Classification Search
CPC ............... H04L 63/083; H04L 41/0806; H04L 41/0803; G06Q 20/206; G06Q 20/20;
(Continued)

(56) References Cited

U.S. PATENT DOCUMENTS 7,437,329 B2 10/2008 Graves
7,634,802 B2 12/2009 Chiloyan
(Continued)

*Primary Examiner* — Nelson Giddins
(74) *Attorney, Agent, or Firm* — Scott P. Zimmerman, PLLC

(57) ABSTRACT

Wireless pairing is automatically performed based on purchase. By providing a unique identifier and/or account number (such as a credit card number), a wireless device is automatically paired to a wireless network. For example, when a smartphone or other mobile device is used to purchase an electronic door lock, the smartphone may be used to identify security credentials for accessing the wireless network. A cellular telephone number, for example, may reveal an SSID and/or a network password that is required to access a residential or business WI-FI network. As another example, a credit card number may also be used to identify the security credentials for the wireless network.

20 Claims, 26 Drawing Sheets

(51) Int. Cl.
*H04L 12/24* (2006.01)
*H04W 12/08* (2009.01)
*H04L 29/06* (2006.01)
*G06Q 40/00* (2012.01)
*H04W 12/06* (2009.01)
*H04W 8/24* (2009.01)
*H04L 29/12* (2006.01)

(52) U.S. Cl.
CPC ...... *H04L 41/0806* (2013.01); *H04L 61/1541* (2013.01); *H04L 63/083* (2013.01); *H04L 63/0876* (2013.01); *H04W 8/24* (2013.01); *H04W 12/06* (2013.01); *H04W 12/08* (2013.01); *G06Q 20/209* (2013.01); *G06Q 20/322* (2013.01); *H04M 2203/558* (2013.01)

(58) Field of Classification Search
CPC .... G06Q 20/209; G06Q 20/12; G06Q 20/202; G06Q 20/322; G06Q 20/3255; G06Q 20/327; G06Q 20/3223; H04W 84/18; H04W 12/06; H04W 12/08; H04W 4/005; H04W 4/008
See application file for complete search history.

(56) References Cited

U.S. PATENT DOCUMENTS

| | | | |
|---|---|---|---|
| 7,809,812 B2 | 10/2010 | Doumuki | |
| 8,005,217 B2 | 8/2011 | Pham et al. | |
| 8,120,460 B1 | 2/2012 | Zsu | |
| 8,272,568 B2 * | 9/2012 | Thomas | G06Q 30/0185 235/383 |
| 8,538,019 B2 | 9/2013 | Pham et al. | |
| 8,540,154 B2 | 9/2013 | Thomas | |
| 8,542,665 B2 | 9/2013 | Doumuki | |
| 8,799,989 B1 | 8/2014 | Liu | |
| 9,317,271 B2 * | 4/2016 | McCurdy | G06F 8/61 |
| 9,430,787 B2 | 8/2016 | Dezelak | |
| 2002/0128851 A1 | 9/2002 | Chefalas et al. | |
| 2003/0004737 A1 | 1/2003 | Conquest et al. | |
| 2006/0294350 A1 * | 12/2006 | Yang | H04L 67/02 713/1 |
| 2007/0022058 A1 * | 1/2007 | Labrou | G06Q 20/32 705/67 |
| 2007/0268514 A1 | 11/2007 | Zeldin | |
| 2008/0313448 A1 * | 12/2008 | Doumuki | G06Q 30/06 713/1 |
| 2009/0043871 A1 | 2/2009 | Doumuki | |
| 2010/0017867 A1 | 1/2010 | Fascenda | |
| 2011/0055030 A1 * | 3/2011 | Nicolas | G06Q 20/20 705/16 |
| 2011/0178886 A1 | 7/2011 | O'Connor | |
| 2012/0066120 A1 | 3/2012 | Ringewald | |
| 2012/0108295 A1 | 5/2012 | Schell et al. | |
| 2012/0173348 A1 * | 7/2012 | Yoo | G06Q 20/10 705/16 |
| 2012/0214442 A1 * | 8/2012 | Crawford | H04W 12/06 455/411 |
| 2012/0238209 A1 * | 9/2012 | Walker | H04L 63/18 455/41.2 |
| 2012/0284193 A1 * | 11/2012 | Bharghavan | H04L 9/3263 705/64 |
| 2013/0110662 A1 * | 5/2013 | Dezelak | G06Q 30/0601 705/26.1 |
| 2013/0268400 A1 * | 10/2013 | Ballard | G06Q 30/0641 705/26.8 |
| 2014/0080467 A1 | 3/2014 | Urbanek | |
| 2014/0191041 A1 * | 7/2014 | Zhao | G06K 19/0723 235/492 |
| 2014/0191846 A1 | 7/2014 | Zhao | |
| 2014/0279479 A1 * | 9/2014 | Maniar | G06Q 20/36 705/41 |
| 2014/0282937 A1 * | 9/2014 | Farber | H04L 63/08 726/6 |
| 2014/0282960 A1 * | 9/2014 | Tinnakornsrisuphap | H04L 63/083 726/7 |
| 2014/0349705 A1 | 11/2014 | Haggerty et al. | |
| 2015/0095174 A1 * | 4/2015 | Dua | G06Q 20/20 705/21 |
| 2015/0106270 A1 * | 4/2015 | Burrell | G06Q 20/4016 705/44 |
| 2015/0120473 A1 | 4/2015 | Jung | |
| 2015/0128128 A1 * | 5/2015 | McCurdy | G06F 8/61 717/177 |
| 2015/0141005 A1 | 5/2015 | Suryavanshi | |
| 2015/0221149 A1 * | 8/2015 | Main | G07C 9/00119 340/5.61 |
| 2015/0350888 A1 * | 12/2015 | Miranda | H04M 15/715 705/16 |
| 2016/0055469 A1 * | 2/2016 | Kim | H04L 41/12 705/21 |
| 2016/0127905 A1 | 5/2016 | Liu | |
| 2016/0156635 A1 * | 6/2016 | Liu | H04W 12/06 726/4 |

* cited by examiner

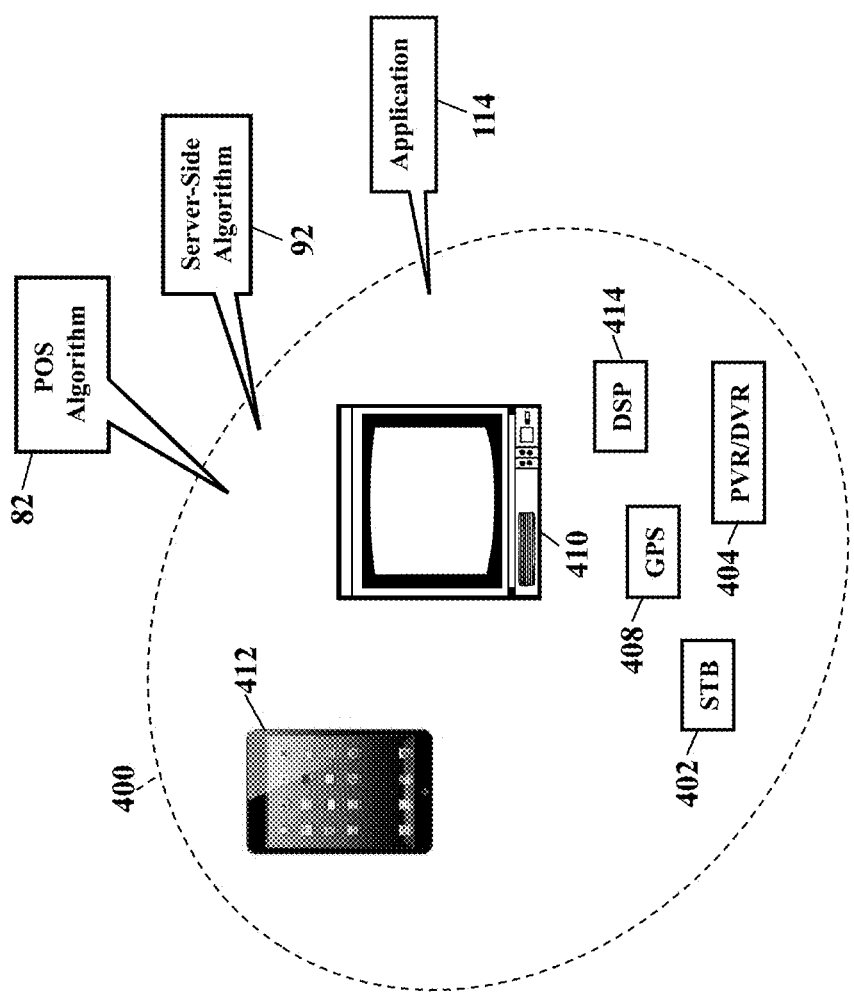

POINT OF SALE PAIRING

CROSS-REFERENCE TO RELATED APPLICATION

This application is a continuation of U.S. application Ser. No. 14/620,318 filed Feb. 12, 2015, since issued as U.S. Pat. No. 9,680,822, and incorporated herein by reference in its entirety.

BACKGROUND

Wireless configuration is troublesome. Many people have difficulty pairing wireless devices to a wireless network. As a result, many people are forced to seek expensive technical support.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 25-26 depict still more operating environments for additional aspects of the exemplary embodiments.

DETAILED DESCRIPTION

Exemplary embodiments will now be described more fully hereinafter with reference to the accompanying drawings. Exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, applicant(s) intend that such equivalents include both currently known equivalents as well as equivalents developed in the future (i.e., any elements developed that perform the same function, regardless of structure).

Thus, for example, those of ordinary skill in the art will appreciate that the diagrams, schematics, illustrations, and the like represent conceptual views or processes illustrating exemplary embodiments. The functions of the various elements shown in the figures may be provided through the use of dedicated hardware as well as hardware capable of executing associated software. Those of ordinary skill in the art further understand that exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
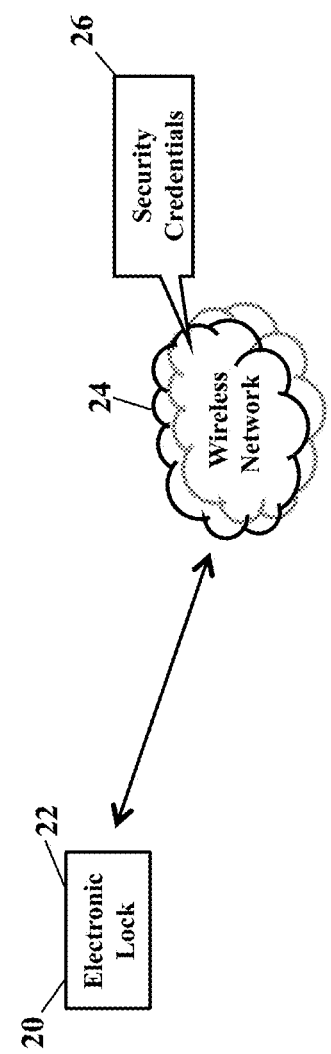
FIGS. 1-4 are simplified schematics illustrating an environment in which exemplary embodiments may be implemented.

FIGS. 1-4 are simplified schematics illustrating an environment in which exemplary embodiments may be implemented. FIG. 1 illustrates automatic pairing of a wireless device 20 to a wireless network 24. The wireless device 20, for simplicity, is illustrated as an electronic lock 22, which a customer likely purchases for some physical door or window in a home or business. The wireless device 20, however, may be a tablet computer, a smartphone, a watch, or any other processor-controlled device, as later paragraphs will explain. Regardless, when the customer purchases the wireless device 20, exemplary embodiments automatically provision the wireless device 20 to the wireless network 24. That is, the wireless device 20 may be automatically configured for access to the customer's residential or business wireless network 24, with little or no manual effort. As this disclosure will explain, exemplary embodiments automatically retrieve security credentials 26 currently or permanently assigned to the wireless network 24. So, when the purchasing customer brings the electronic lock 22 home, the customer need only "open the box" and turn "on" its electrical power. The wireless network 24 automatically recognizes the electronic lock 22, thus permitting nearly immediate installation, network communication, and operation. The customer is relieved of a cumbersome manual configuration involving network identification and security passwords. The customer is also relieved of conventional schemes that use temporary passwords or other temporary settings.

Figure 2:
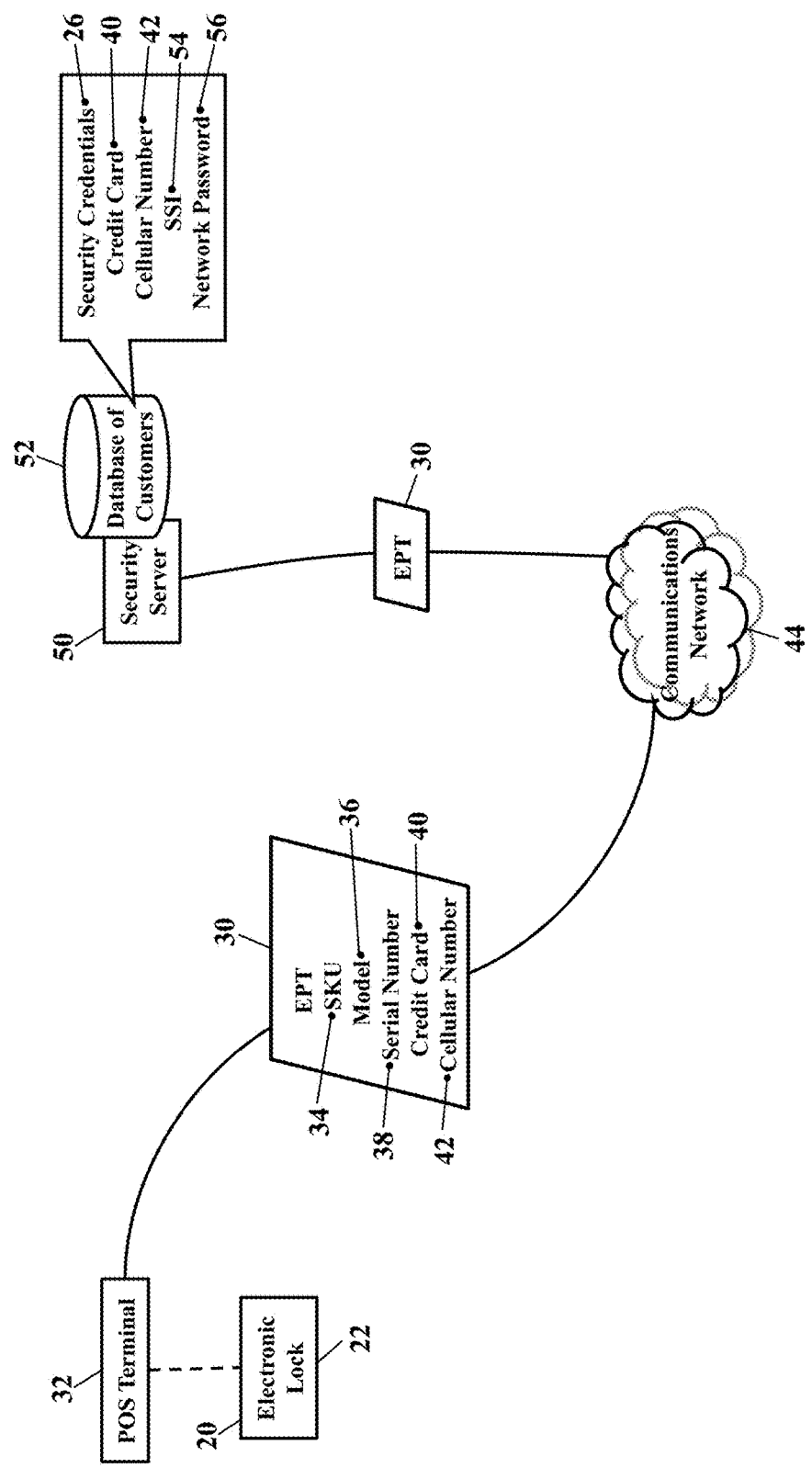

FIG. 2 illustrates a retail purchase. When the customer purchases the electronic lock 22, an electronic purchase transaction (or "EPT") 30 may be generated. A point of sale terminal (or "POS") 32, for example, may generate the electronic purchase transaction 30 at a bricks and mortar retail store. The electronic purchase transaction 30, however, may alternatively be generated from an e-commerce website or server, as later paragraphs will explain. Regardless, the electronic purchase transaction 30 may uniquely identify the wireless device 20, such as by a stock keeping unit (or "SKU") 34, model 36, and/or serial number 38 associated with the electronic lock 22. The electronic purchase transaction 30 may also uniquely identify the customer making the purchase, perhaps using the customer's unique credit card number 40 and/or unique cellular telephone number 42. The point of sale terminal 32 sends the electronic purchase transaction 30 into a communications network 44 for routing and delivery to a network address associated with a security server 50.

The security server 50 may automatically determine the security credentials 26. The security server 50 may store and maintain a database 52 of customers. When the security server 50 receives the electronic purchase transaction 30, the security server 50 may query the database 52 of customers for entries associated with the purchasing customer. For example, the security server 50 may query the database 52 of customers for the customer's unique credit card number 40 and/or the customer's unique cellular telephone number 42. The database 52 of customers may thus store database associations between the customer's unique credit card number 40, the customer's unique cellular telephone number 42, and the security credentials 26 of the customer's business or residential wireless network (illustrated as reference numeral 24 in FIG. 1). For example, the database 52 of customers may reveal a wireless fidelity (or WI-FI®) network name (such as a service set identifier or "SSI" 54) and/or a network password 56 of the customer's wireless network 24. Exemplary embodiments may thus use the electronic purchase transaction 30 to uniquely identify the security credentials 26 of the customer's wireless network 24.

Figure 3:
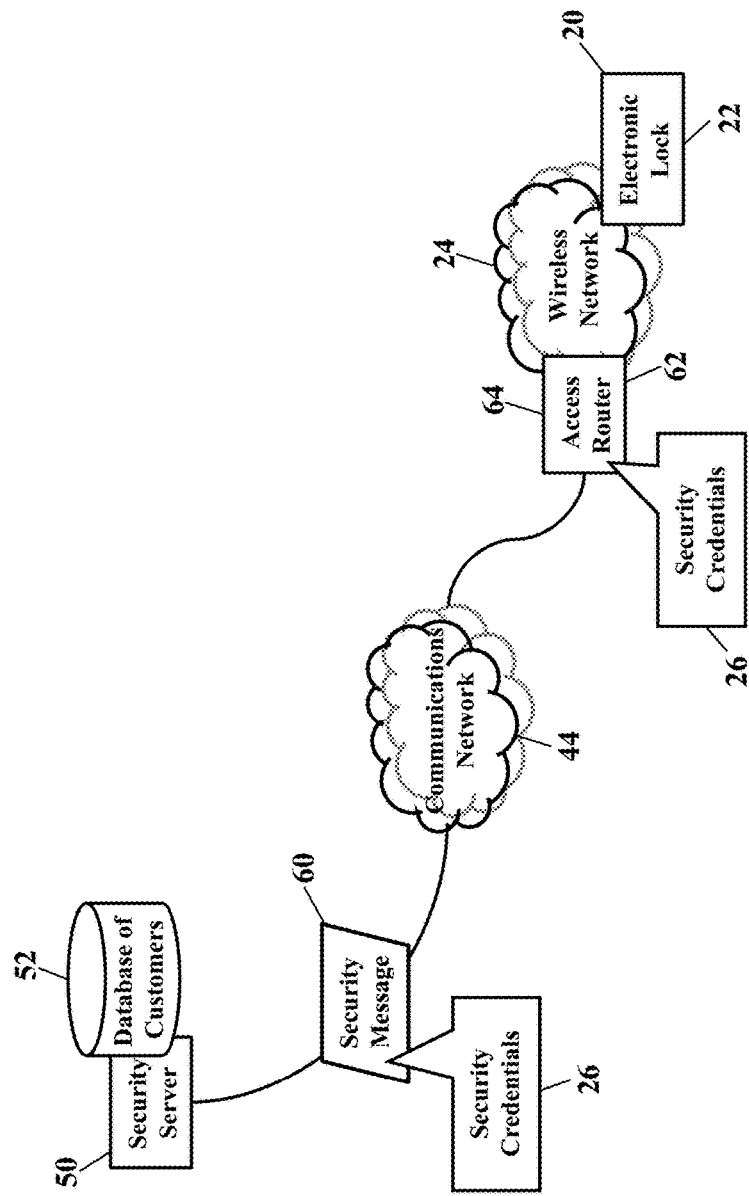

FIG. 3 illustrates automatic pairing. Now that the security credentials 26 are known, the electronic lock 22 may be automatically added to the customer's wireless network 24. The security server 50, for example, may send a packetized security message 60 into the communications network 44 for routing and delivery to a network address associated with an access device 62 serving the customer's wireless network 24. FIG. 3 illustrates the access device 62 as a wireless access router 64, but the access device 62 may be any gateway, modem, or any other device, as later explained. The security message 60 may instruct the access device 62 to recognize and allow network access to the electronic lock 22. Because the security message 60 may also include the security credentials 26, the security message 60 may act as a proxy. The security message 60 may instruct or authorize the access device 62 to accept the security credentials 26 presented on behalf of the electronic lock 22. When the electronic lock 22 is electrically powered, the electronic lock 22 may establish wireless communication with the access device 62 and be nearly immediately recognized by proxy. The access device 62 thus allows wireless access to the customer's wireless network 24, without additional pairing steps.

Exemplary embodiments thus automate wireless pairing. Exemplary embodiments may pair the wireless device 20 merely in response to the customer's purchase. Exemplary embodiments integrate purchase records with trusted, confidential customer information. Suppose, for example, that the customer purchases the wireless device 20 (e.g., the electronic lock 22) at a network provider's retail site (such as an AT&T® or VERIZON® store). Exemplary embodiments may thus marry purchase records with confidential billing records and/or network information, thus supporting automatic provisioning. As a further example, a new or existing AT&T® DIGITAL LIFE® customer may purchase wireless devices and have them automatically provisioned to the customer's wireless network 24. Exemplary embodiments may also automatically pair purchases from other retailers, such as BEST BUY® or any other retailer. Even mobile payments and e-commerce website purchases may permit automatic provisioning of wireless devices, as later paragraphs will explain. Indeed, whoever or whatever the seller, exemplary embodiments permit quick pairing based on the sale.

Exemplary embodiments reduce, or even eliminate, manual pairing. Conventional wireless devices must be manually paired to the customer's wireless network 24. Most often this manual pairing requires entry of network password, which is cumbersome for many customers and fraught with erroneous entries. Moreover, the manual pairing may also require downloading or updating software and creating credentials. Even a small typographic error may cause a failure in access, thus requiring a time-consuming call to technical help or even an expensive on-site visit. Exemplary embodiments, instead, automatically add the purchased wireless device 20 to the customer's wireless network 24. The wireless device 20, in other words, is automatically allowed access to the customer's wireless network 24, in response to the purchase. No additional pairing effort may be needed, such as identification and/or entry of the service set identifier (or "SSID") and network password (illustrated, respectively, as reference numerals 54 and 56 in FIG. 2). The customer merely turns on the wireless device 20, thus causing the wireless device 20 to expose itself to the customer's wireless network 24. The wireless device 20 is automatically and permanently paired with little or no effort. No change in the customer's security credentials 26 is required, and no temporary measures are needed.

Automatic pairing, however, may have restrictions. Not just any entity may have authority to obtain the security credentials 26 of the customer's wireless network 24. Perhaps only trusted partner entities have permission to retrieve the SSI 54 and/or the network password 56 of the customer's wireless network 24. For example, perhaps only a trusted or credentialed retailer may send the electronic purchase transaction 30 to the security server 50. If the electronic purchase transaction 30 does not originate from a known, recognized network address, then the security server 50 may decline automatic pairing. The security server 50 may thus inspect the electronic purchase transaction 30 for a network address and match to a list of approved pairing partners. The electronic purchase transaction 30 may additionally or alternatively be inspected for a required password, encryption, or other credential before automatic pairing may proceed. Exemplary embodiments may thus only permit certain providers in the ecosystem to access the security credentials 26 and program the electronic lock 22, the security server 50, and/or the access device 62. Unrecognized entities may thus be prevented from rogue pairings.

FIG. 3 illustrates automatic pairing. Now that the security credentials 26 are known, the electronic lock 22 may be automatically added to the customer's wireless network 24. The security server 50, for example, may send a packetized security message 60 into the communications network 44 for routing and delivery to a network address associated with an access device 62 serving the customer's wireless network

24. FIG. 3 illustrates the access device 62 as a wireless access router 64, but the access device 62 may be any gateway, modem, or any other device, as later explained. The security message 60 may instruct the access device 62 to recognize and allow network access to the electronic lock 22. Because the security message 60 may also include the security credentials 26, the security message 60 may act as a proxy. The security message 60 may instruct or authorize the access device 62 to accept the security credentials 26 presented on behalf of the electronic lock 22. When the electronic lock 22 is electrically powered, the electronic lock 22 may establish wireless communication with the access device 62 and be nearly immediately recognized by proxy. The access device 62 thus allows wireless access to the customer's wireless network 24, without additional pairing steps.

Figure 4:
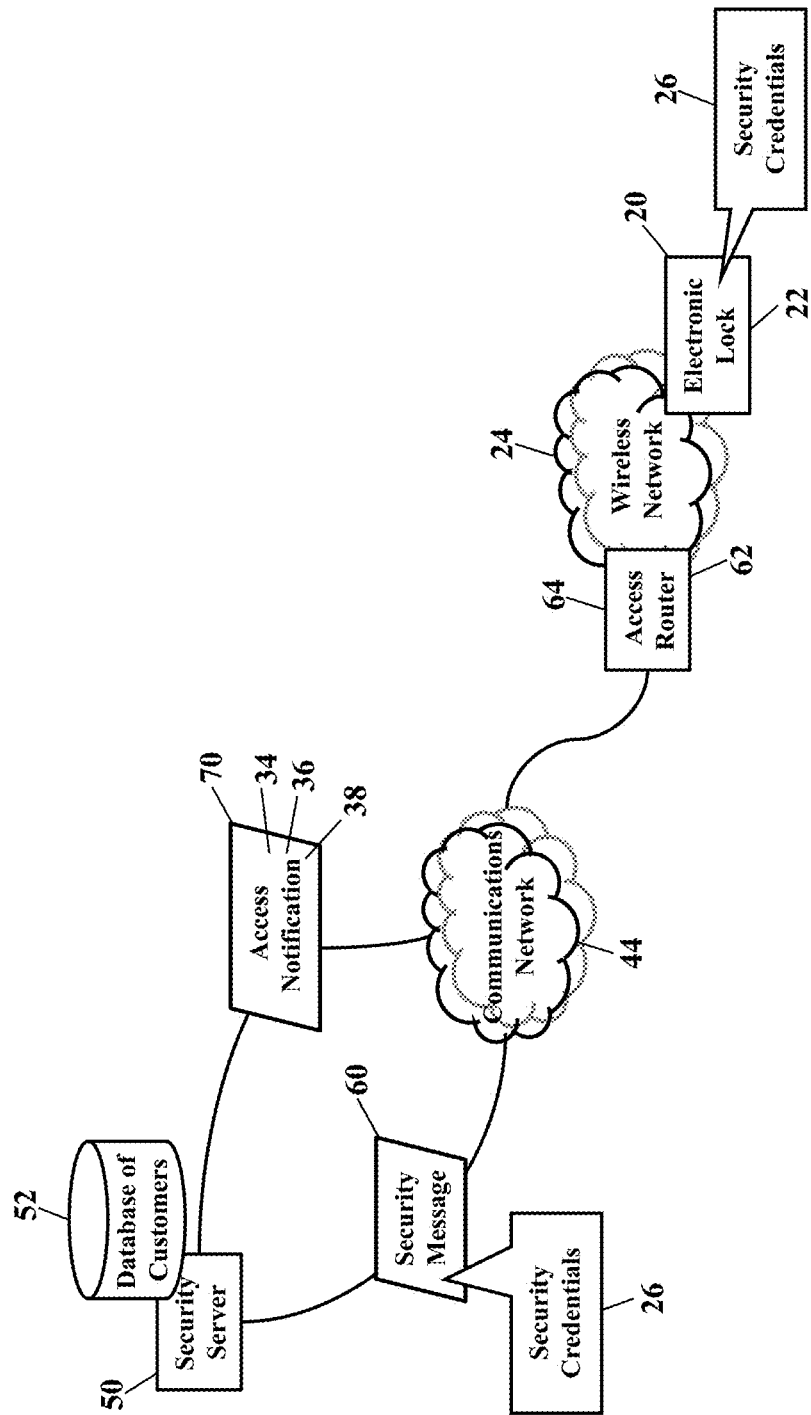

FIG. 4 illustrates a push pairing. Here exemplary embodiments may push the security credentials 26 directly to the electronic lock 22. That is, when the customer powers up the wireless device 20, the wireless device 20 requests access to the customer's wireless network 24. Exemplary embodiments may then retrieve and send, or "push," the security credentials 26 to the electronic lock 22. As FIG. 4 illustrates, the security server 50 may be informed when the electronic lock 22 exposes itself to the purchasing customer's wireless network 24. That is, when the electronic lock 22 is electrically powered and attempts or requests access to the customer's wireless network 24, exemplary embodiments may inform the security server 50. For example, the access device 62 may send a packetized access notification 70 to the security server 50. The wireless access router 64, for example, may store or execute code or programming that forces or commands the access notification 70 in response to any attempted access to the customer's wired or wireless network 24. The access notification 70 may thus alert the security server 50 to the attempted network access of the electronic lock 22. The access notification 70 may further include information that uniquely identifies the requesting device, such as the SKU 34, the model number 36, and/or the serial number 38.

The security server 50 may confirm the attempted access. When the security server 50 receives the access notification 70, the security server 50 may query the database 52 of customers for the unique identifier of the requesting device (such as the SKU 34, the model number 36, and/or the serial number 38). The security server 50, in other words, may query to confirm the customer's purchase of the electronic lock 22. The security server 50 may thus retrieve or match the database association between the electronic lock 22 and the customer's wireless network 24. If the database 52 of customers matches an entry to the unique identifier of the electronic lock 22, then the security server 50 may retrieve the corresponding security credentials 26. The security server 50 may then send the security message 60 directly to an address assigned to the electronic lock 22, thus automatically providing the security credentials 26 of the customer's wireless network 24. Again, then, the user has merely powered on the electronic lock 22 for automatic pairing. No manual configuration may be needed. However, if no database association matches the unique identifier of the electronic lock 22, then perhaps the purchase or identity cannot be confirmed or authenticated. Exemplary embodiments may decline automatic pairing, thus requiring manual configuration.

Exemplary embodiments may include other features. For example, once the unique cellular telephone number 42 is obtained, the customer's account may be determined (as this disclosure will further explain). Knowledge of the user-customer, in other words, permits account association for application-level purposes. For example, once the user is known (perhaps using the cellular telephone number 42), exemplary embodiments associate control of the electronic lock 22 to only certain applications or services. As one example, electronic or physical control of the electronic lock 22 may be restricted to the customer's AT&T® DIGITAL LIFE® account service, based on the cellular telephone number 42. However, exemplary embodiments may also yield control to other permitted applications and services having a permissive association with the cellular telephone number 42. Moreover, exemplary embodiments may limit or extend control to other devices associated with the same customer (such as the customer's tablet, car, or watch sharing a common user profile association).

Figure 5:
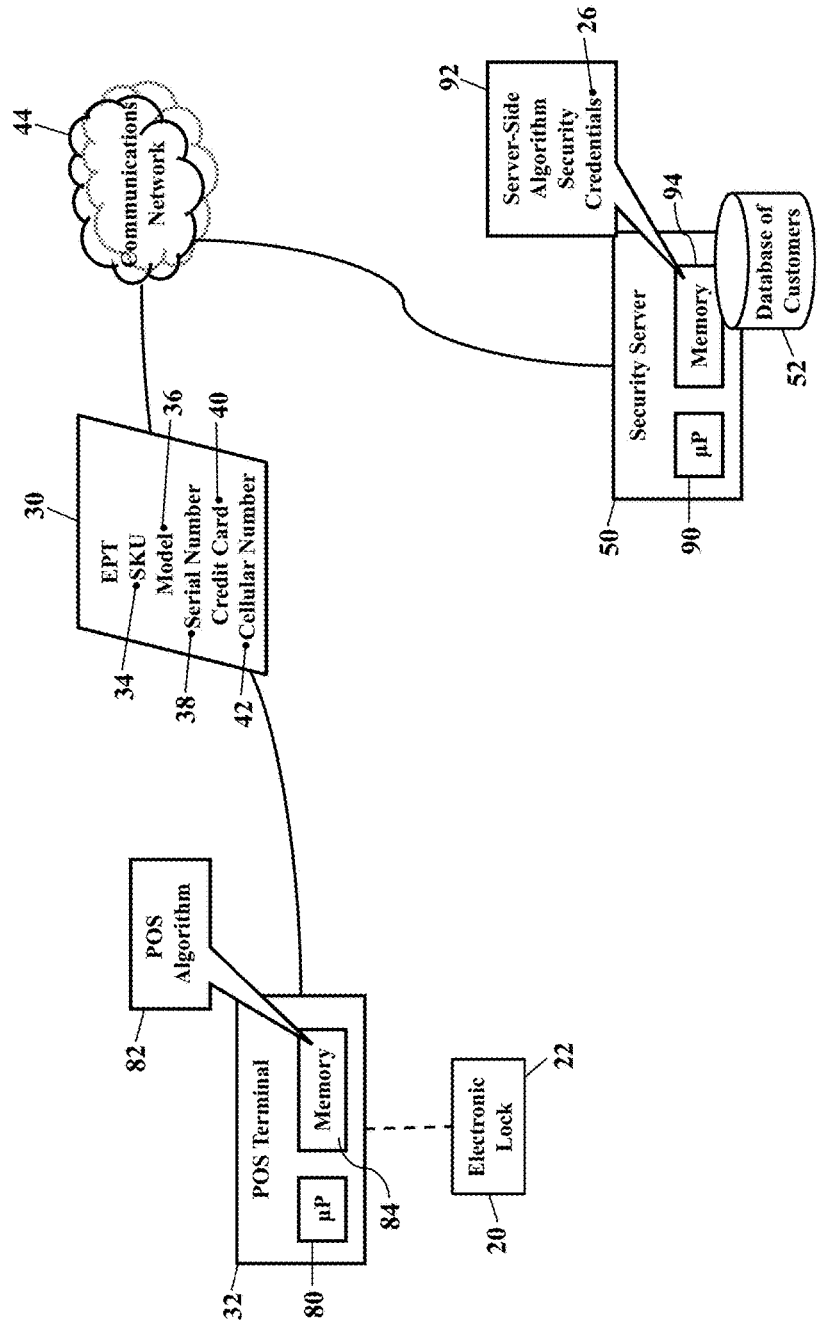
FIGS. 5-7 are more detailed block diagrams illustrating the operating environment, according to exemplary embodiments.
Figure 6:
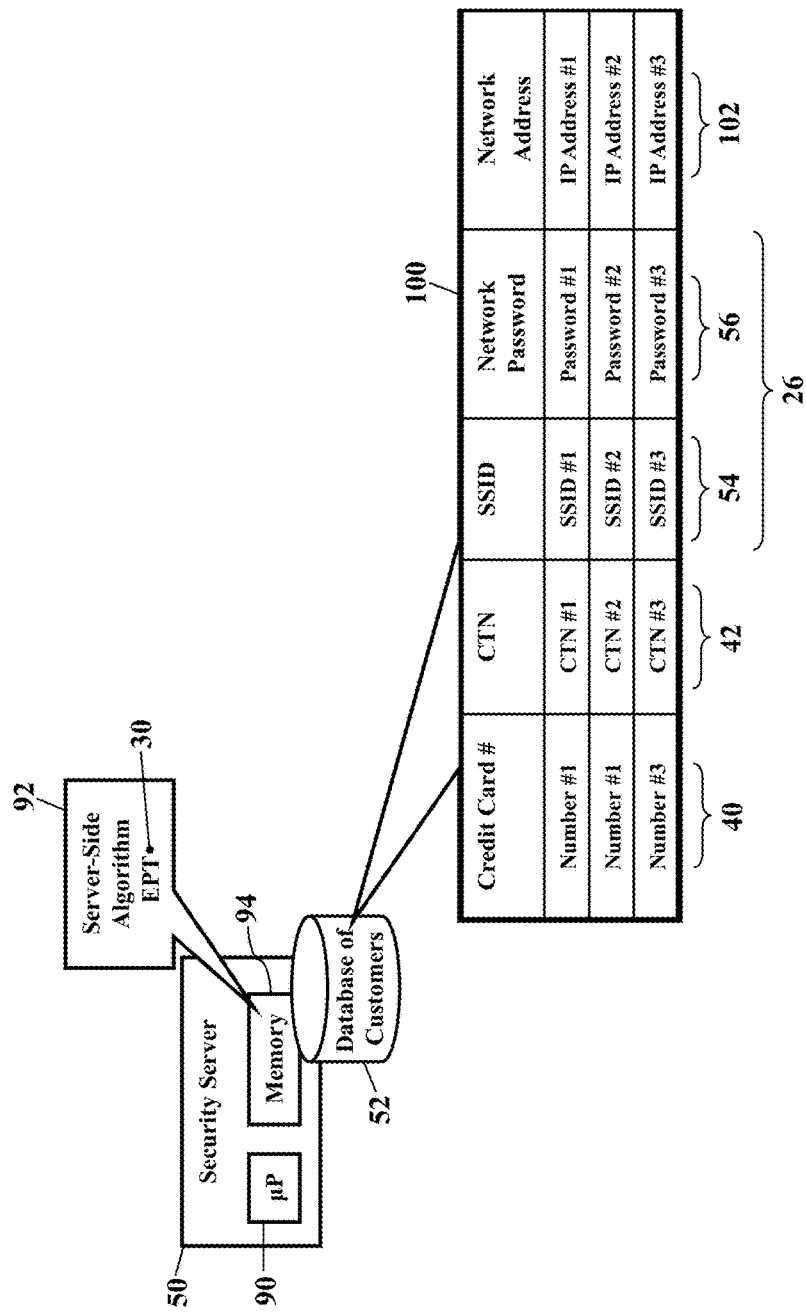
Figure 7:
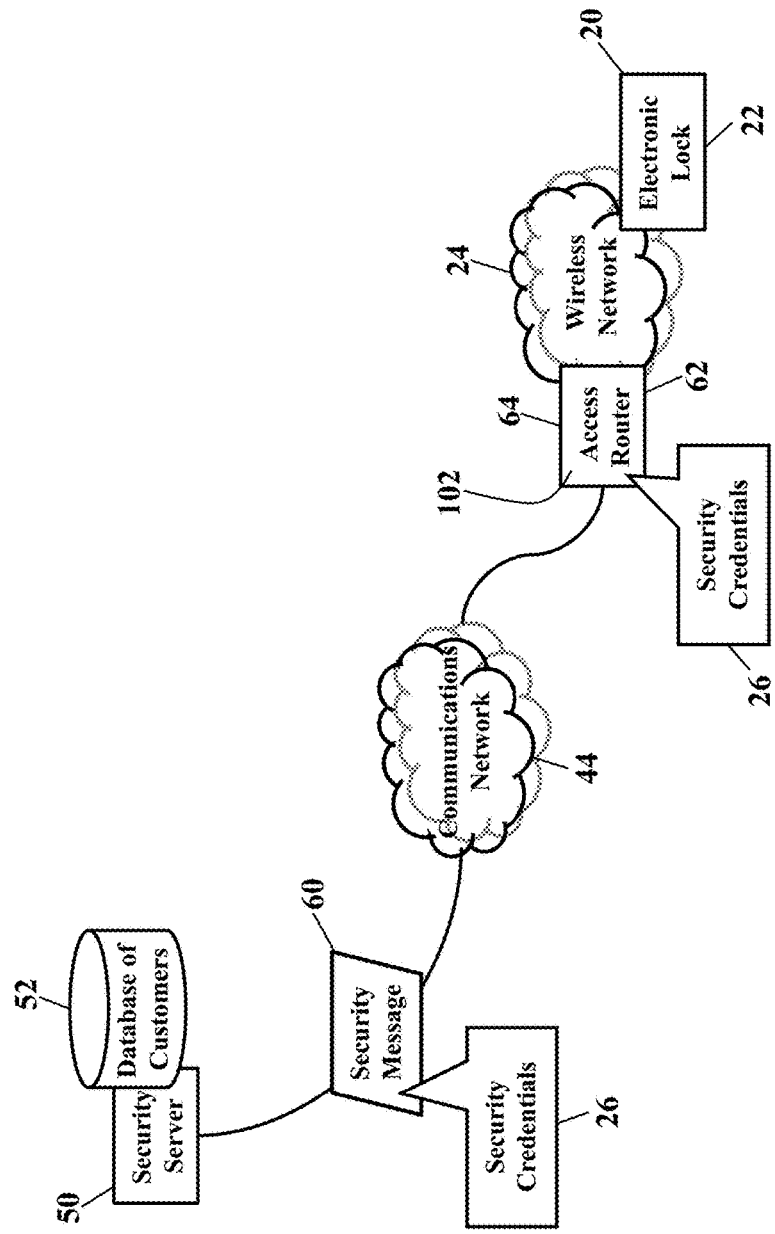

FIGS. 5-7 are more detailed block diagrams illustrating the operating environment, according to exemplary embodiments. The point of sale ("POS") terminal 32 conducts or participates in the purchase of the wireless device 20 (again illustrated as the electronic lock 22). The point of sale terminal 32 has a processor 80 (e.g., "μP"), application specific integrated circuit (ASIC), or other component that executes a POS algorithm 82 stored in a local memory 84. The POS algorithm 82 instructs the processor 80 to perform operations, such as generating and/or supplying information for the electronic purchase transaction (or "EPT") 30. The electronic purchase transaction 30 may uniquely identify the electronic lock 22 by its stock keeping unit (or "SKU") 34, model number 36, and/or serial number 38. The electronic purchase transaction 30 may also uniquely identify the customer's credit card number 40, the device participating in the purchase (such as the cellular telephone number 42), or any other account information. The point of sale terminal 32 may packetize electronic purchase transaction 30 into packets of data according to a packet protocol, such as the Internet Protocol. The packets of data contain bits or bytes of data describing the contents, or payload, of a message. A header of each packet of data may contain routing information identifying an origination address and/or a destination address. The point of sale terminal 32 calls or invokes a network interface to send the electronic purchase transaction 30 into the communications network 44 for routing and delivery to the network address assigned to the security server 50. Exemplary embodiments may thus cause or instruct the point of sale terminal 32 to inform or notify the security server 50 of the purchase of any or all wireless devices, such as the electronic lock 22.

The security server 50 may then obtain the customer's security credentials 26. The security server 50 has a processor 90 (e.g., "μP"), application specific integrated circuit (ASIC), or other component that executes a server-side algorithm 92 stored in a local memory 94. The server-side algorithm 92 instructs the processor 90 to perform operations, such as querying the database 52 of customers for the customer's security credentials 26.

FIG. 6 illustrates the database 52 of customers. For simplicity the database 52 of customers is illustrated as a table 100 that maps, relates, or associates different customers to their corresponding security credentials 26 for one or more of their WIFI®, BLUETOOTH®, or other wireless networks. FIG. 6 illustrates the database 52 of customers as being locally stored in the memory 94 of the security server 50, but some or all of the database entries may be remotely maintained at some other server or location in the communications network (illustrated as reference numeral 44 in FIG. 5). While FIG. 6 only illustrates a few entries, in practice the database 52 of customers may contain many entries for hundreds or even thousands of customers. For example, an entry may associate the customer's credit card number 40 and/or a unique cellular identifier (such as the cellular telephone number 42) to the security credentials 26 for her wireless network. When the security server 50 receives the electronic purchase transaction (or "EPT") 30, the server-side algorithm 92 causes the processor 90 to query for customer's credit card number 40 and/or the unique cellular identifier detailed or described in the electronic purchase transaction 30. If the database 52 of customers contains a matching entry, the security server 50 retrieves the customer's corresponding security credentials 26. FIG. 6 thus illustrates the security server 50 retrieving the existing service set identifier (or "SSID") 54 and network password 56 of the customer's wireless network 24. The security server 50 may also retrieve a network address 102 associated with the customer's wireless network 24.

The database 52 of customers may be comprehensive. Many customers, subscribers, and/or users will elect to have their security credentials 26 detailed in the database 52 of customers. Centralized storage and access permits the automatic pairing, which is a great convenience to most people. Indeed, as wireless devices constantly improve, users frequently add and remove devices from their networks. Automatic pairing eases and simplifies the purchasing and installation process. The database 52 of customers may be a comprehensive and centralized repository of customer accounts, detailing a rich repository of customer profiles, including their security credentials 26.

FIG. 7 illustrates network access. Now that the customer's security credentials 26 are known, exemplary embodiments may automatically authorize wireless access for the wireless device 20. The security server 50 may send the security message 60 into the communications network 44 for routing and delivery to the network address 102 associated with customer's wireless network 24. FIG. 7 illustrates the security message 60 routing to the access device 62 serving the customer's wireless network 24, such as the wireless access router 64. However, the access device 62 may be any network interface to an access network, such as a gateway, cable modem, or DSL modem. The network address 102 may thus point to or identify whatever access device 62 manages or allows access to the customer's wireless network 24. Regardless, the security message 60 may instruct the access device 62 to recognize and allow access to the electronic lock 22. Because the security message 60 may identify or confirm the network security credentials 26, the security message 60 may act as a proxy. The security message 60 may thus instruct or authorize the wireless access router 64 to accept the security credentials 26 presented on behalf of the electronic lock 22. When the electronic lock 22 exposes itself to the customer's wireless network 24, the wireless access router 64 may thus automatically recognize the electronic lock 22 and permit wireless access to the customer's wireless network 24, without additional pairing steps.

Exemplary embodiments thus automate wireless pairing. Exemplary embodiments pair the wireless device 20 merely in response to purchase. The database 52 of customers may be constructed and maintained to integrate point of sale systems with trusted, confidential customer information. Suppose, for example, that the customer purchases the wireless device 20 (e.g., the electronic lock 22) at a network provider's retail site (such as an AT&T® or VERIZON® store). Exemplary embodiments may thus marry purchase records with billing records and/or network information to support automatic provisioning. As a further example, a new or existing AT&T® DIGITAL LIFE® customer may purchase wireless devices and have them automatically provisioned to the customer's wireless network 24. Exemplary embodiments may also automatically pair purchases from other retailers, such as BEST BUY® and any other retailer. Whatever the retailer, the point of sale terminal 32 may inform the security server 50, thus permitting quick pairing based on the sale.

Figure 8:
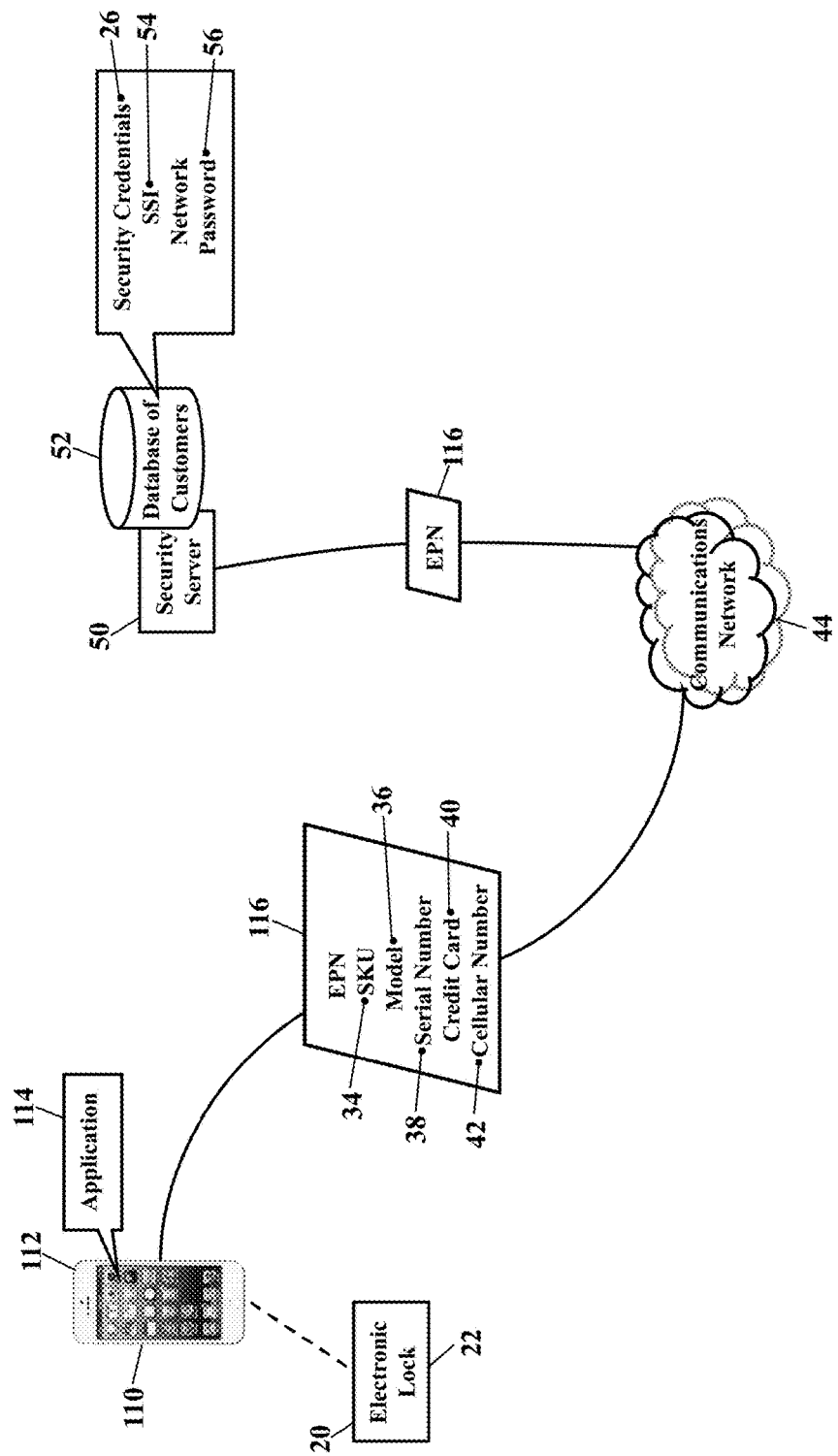
FIGS. 8-9 are schematics illustrating mobile payment, according to exemplary embodiments.
Figure 9:
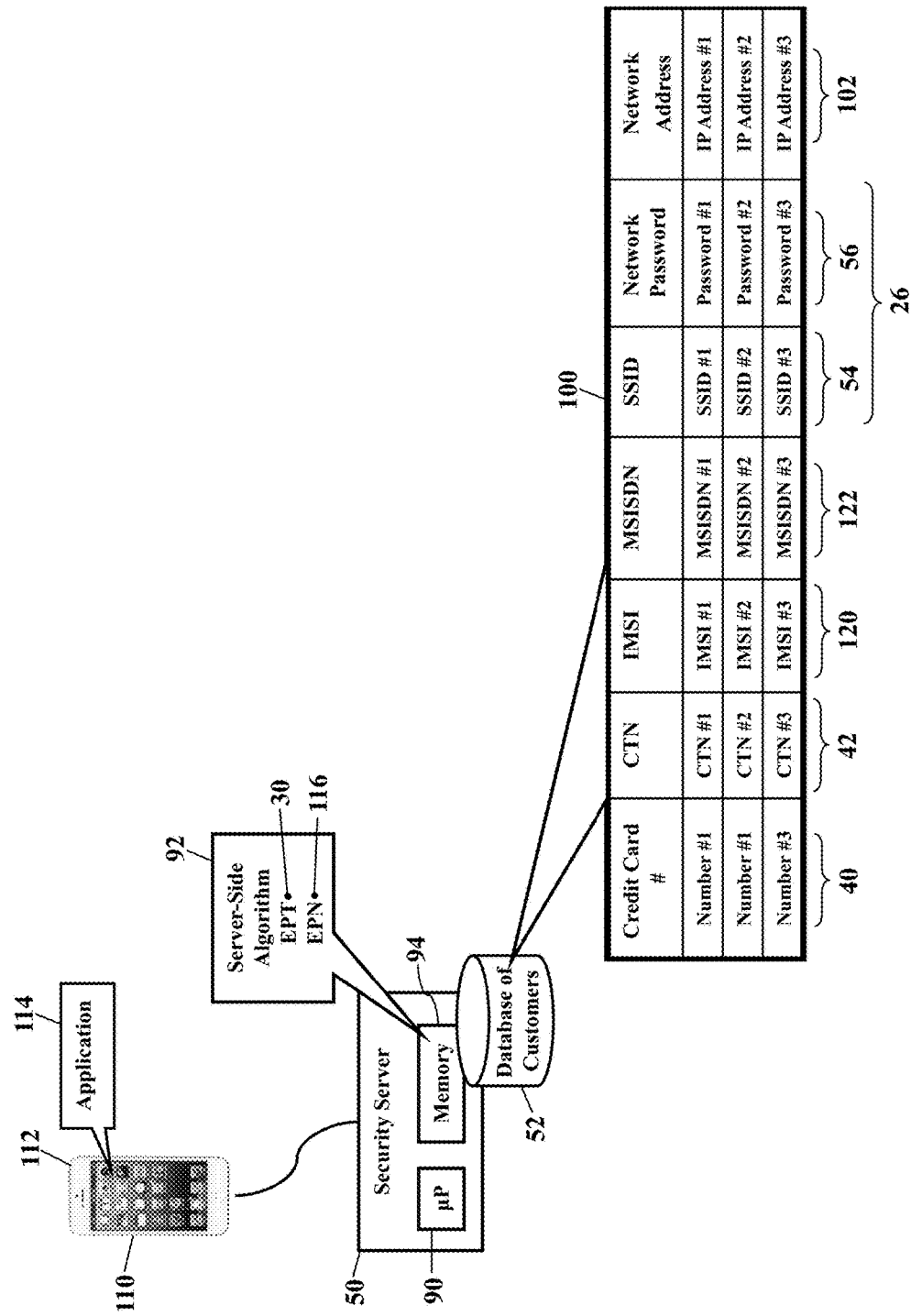

FIGS. 8-9 are schematics illustrating mobile payment, according to exemplary embodiments. Here the customer's mobile device 110 may participate in the pairing process. Suppose the customer uses her smartphone 112 to purchase the electronic lock 22. The smartphone 112 may thus notify the security server 50 of the purchase. The customer's smartphone 112, for example, may have a processor and memory (not shown for simplicity) that stores and executes a software application 114. When the smartphone 112 participates in or conducts some purchase transaction, the software application 114 causes the smartphone 112 to wirelessly send a packetized electronic purchase notification (or "EPN") 116 into a wireless network for routing and delivery to the network address associated with security server 50. The electronic purchase notification 116 may uniquely identify the electronic lock 22 by its stock keeping unit (or "SKU") 34, model 36, and/or serial number 38, along with the customer's credit card number 40 and/or cellular telephone number 42. When the security server 50 receives the electronic purchase notification 116, the security server 50 may query the database 52 of customers for the customer's corresponding security credentials 26, as this disclosure explains. Exemplary embodiments may then automatically pair the electronic lock 22, again as this disclosure explains. Exemplary embodiments may thus be utilized in the mobile e-commerce environment, where wireless devices are automatically paired based on purchases using the customer's mobile devices.

FIG. 9 further illustrates the database 52 of customers. Here the database 52 of customers may further uniquely link the mobile device 110 to each customer's network security credentials 26. FIG. 9, for example, illustrates the database 52 of customers including data representing the customer's unique cellular identifier, such as an International Mobile Subscriber Identity (or "IMSI") 120 or Mobile Station International Subscriber Directory Number ("MSISDN") 122. Whenever the mobile device 110 sends messages or information, the mobile device 110 may self-report its IMSI 120 and/or its MSISDN 122. The electronic purchase transaction 30 and/or the electronic purchase notification 116 may thus uniquely identify the mobile device 110. The security server 50 may thus query the database 52 of customers using either of these unique identifiers as a query term to retrieve the corresponding customer's security credentials 26.

Exemplary embodiments may thus be applied to any and all connected devices. That is, the wireless device 20 is automatically paired for communication with all other connected devices on the customer's wireless network 24. Moreover, exemplary embodiments may be applied to an application layer of the customer's wireless network 24, not just an access layer. Indeed, exemplary embodiments may be applied to any wireless network utilizing any networking standard or frequency, as later paragraphs will explain. Exemplary embodiments may use the customer's unique cellular identifiers to reveal the customer's existing security credentials 26.

Figure 10:
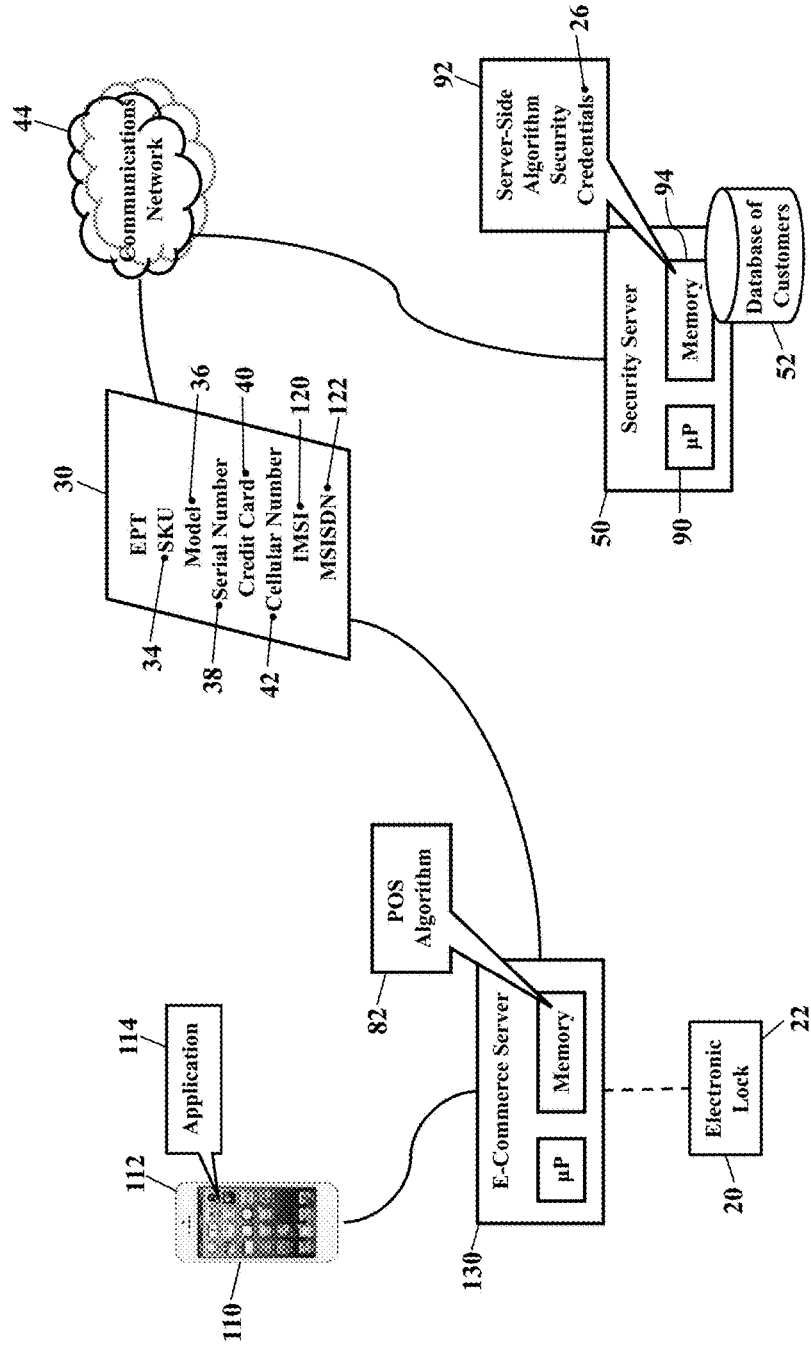
FIG. 10 is a schematic further illustrating e-commerce pairing, according to exemplary embodiments.

FIG. 10 is a schematic further illustrating e-commerce pairing, according to exemplary embodiments. Here an e-commerce server 130 may notify the security server 50 of online purchases. Many e-commerce websites offer wireless, connected devices for purchase on a website. The customer's device (such as her smartphone 112) may receive one or more web pages having website links to products for sale. When the customer selects her desired product for purchase (such as the wireless device 20), the e-commerce server 130 may notify the security server 50 of the customer's purchase. The e-commerce server 130, for example, may generate and send the electronic purchase transaction 30 to the network address associated with the security server 50. The security server 50 may thus be notified of the SKU 34, the model number 36, and/or the serial number 38, along with the customer's credit card number 40, cellular telephone number 42, IMSI 120, and/or MSISDN 122. When the security server 50 receives the electronic purchase transaction 30, the security server 50 may query the database 52 of customers and retrieve the customer's corresponding security credentials 26, as this disclosure explains. Exemplary embodiments may then automatically pair the electronic lock 22, again as this disclosure explains. Exemplary embodiments may thus be further utilized in the e-commerce environment, where wireless devices are automatically paired based on website purchases.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may be applied to other networking environments. The above paragraphs generally refer to the customer's residential or business wireless network 24. Exemplary embodiments, however, may be applied to any other wireless networks. For example, the user's smartphone 112 may establish BLUETOOTH® and/or WI-FT® communications links with other devices or to other networks. The user's smartphone 112, for example, may establish wireless communication with the security server 50 using cellular or WIFI® communication. The user's smartphone 112 may also establish a BLUETOOTH® connection to a nearby, proximate device. The user's smartphone 112 may pair with a vehicle in a hot spot networking environment (e.g., an LTE-enabled car).

Exemplary embodiments thus present a secure solution. Whenever the wireless network 24 is protected from unauthorized access, exemplary embodiments reduce or eliminate pairing problems. The security credentials 26 may be safely provided to recognized devices, thus preventing rogue access. No pre-configuration is necessary, and no standardized protocol is required. Indeed, exemplary embodiments may be applied to wireless fidelity (WI-FI®) roaming proposals (such as IEEE §802.11u), thus allowing networks and devices to advertise or broadcast compliance with Hotspot 2.0 credentials. In other words, if a wireless device complies with IEEE §802.11u, the network's corresponding security credentials 26 may be retrieved and shared, perhaps even if the wireless device is not recognized.

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 11:
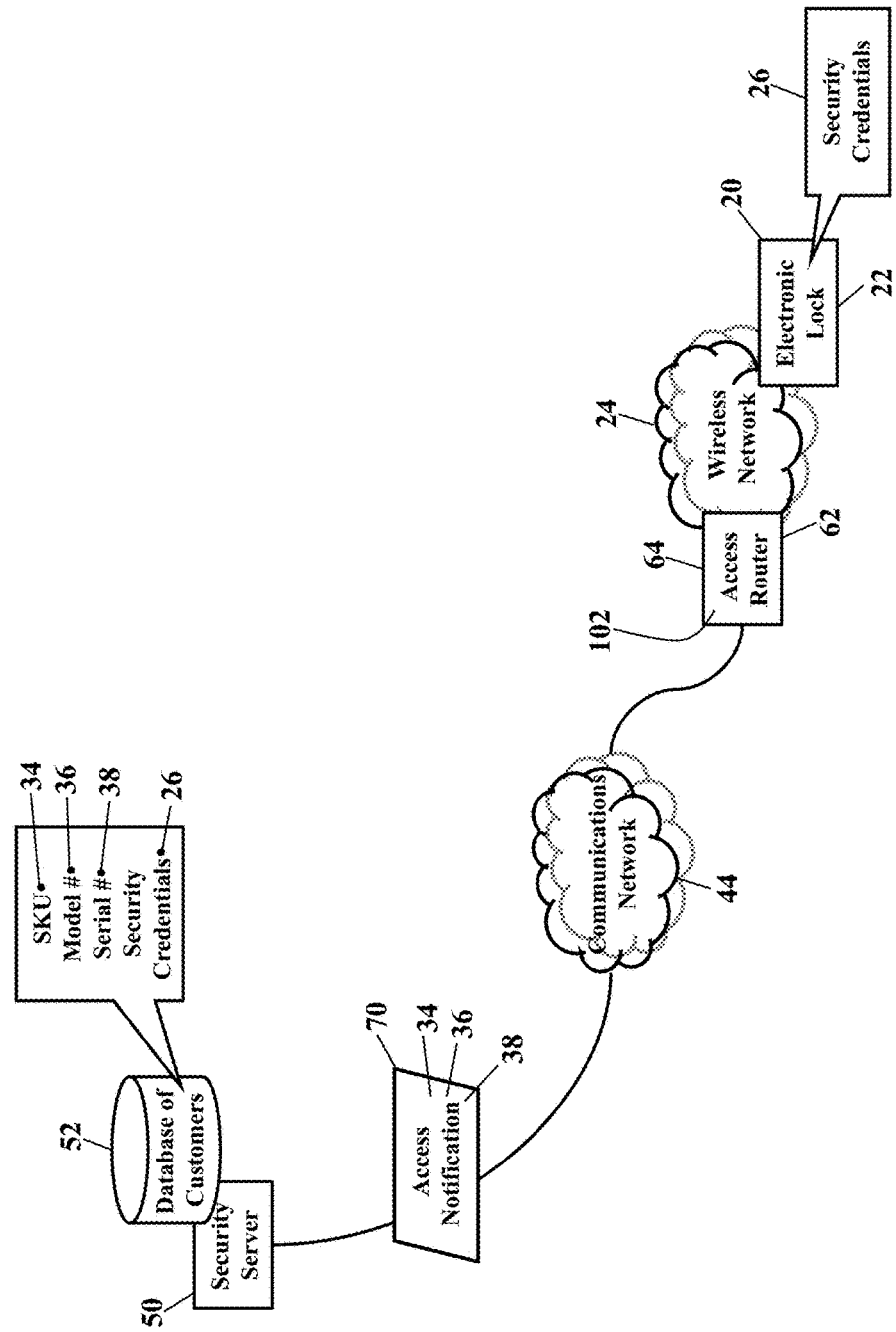
FIGS. 11-13 are more schematics illustrating automatic pairing, according to exemplary embodiments.
Figure 12:
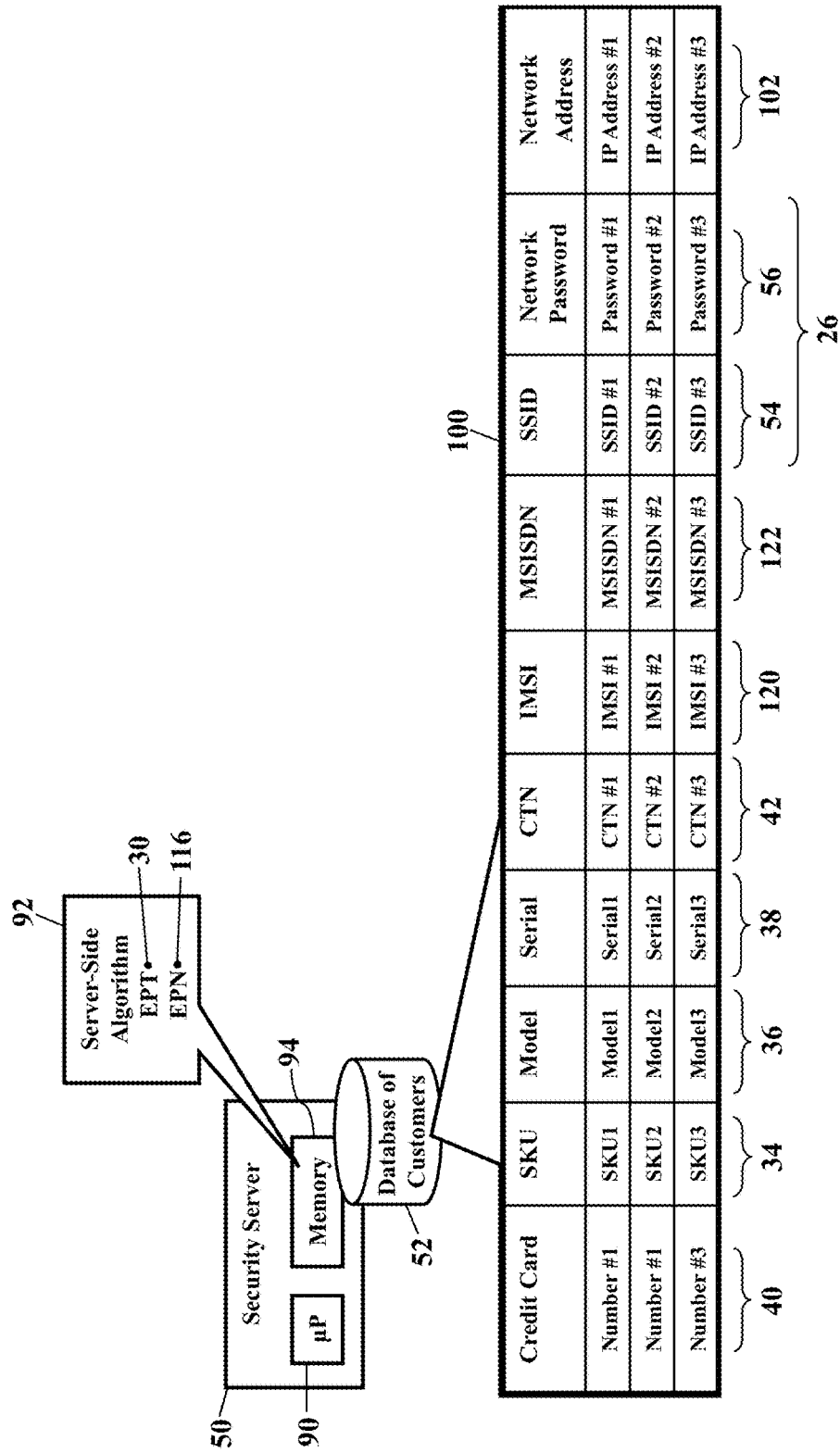
Figure 13:
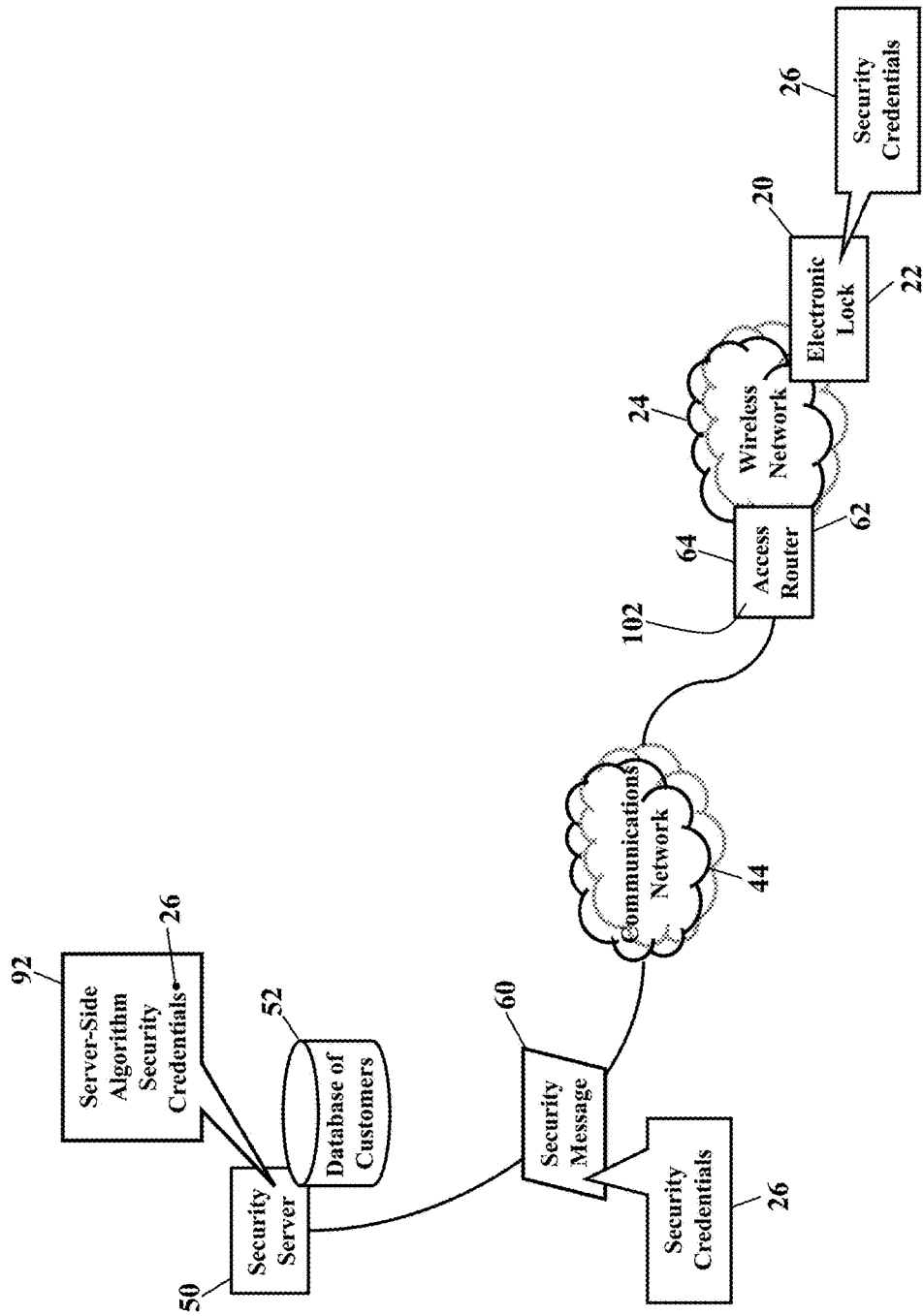

FIGS. 11-13 are more schematics illustrating automatic pairing, according to exemplary embodiments. Here exemplary embodiments may log and verify the purchases associated with the customer. As an example, when the customer purchases the wireless device 20, the wireless device 20 may be associated with the customer's profile in the database 52 of customers. Later, when the wireless device 20 is exposed to the customer's wireless network 24, exemplary embodiments may verify the purchase.

FIG. 11 illustrates the exposure. The customer opens the newly purchased wireless device 20 and provides electrical power (such as by turning on or activating the electronic lock 22). When the wireless device 20 is electrically powered, the wireless device 20 may request access to the customer's wireless network 24. Many wireless devices broadcast a request that seeks wireless access to the customer's wireless network 24. When the access device 62 receives the access request, the access device 62 may notify the security server 50. For example, the access device 62 may send the access notification 70 to the security server 50. Exemplary embodiments may thus alert the security server 50 to the attempted network access of the electronic lock 22. The access notification 70 may further include information that uniquely identifies the electronic lock 22, such as its SKU 34, model number 36, and/or serial number 38. The security server 50 may then query the database 52 of customers to verify the wireless device 20.

FIG. 12 again illustrates the database 52 of customers. Here, though, the database 52 of customers may be expanded to contain device information. That is, the database 52 of customers may contain additional entries that log the connected devices purchased by the customer. Whenever the security server 50 receives the electronic purchase transaction ("EPT") 30 and/or the electronic purchase notification ("EPN") 116, the security server 50 may log each purchase in the database 52 of customers. That is, entries may be added for database associations between the wireless device 20 (e.g., its SKU 34, model number 36, and/or serial number 38) and the customer's unique cellular information (e.g., the IMSI 120 and/or the MSISDN 122). The database 52 of customers may thus inventory the membership or ownership of the customer's devices. When the security server 50 receives the access notification 70, the security server 50 may then query to confirm the customer's purchase of the electronic lock 22. The security server 50, for example, queries for the wireless device 20 (e.g., its SKU 34, model number 36, and/or serial number 38) identified by the network address 102 associated with the access device 62 (e.g., the access router 64 illustrated in FIG. 11). If the SKU 34, model number 36, and/or serial number 38 match the database entries for the network address 102, then the security server 50 may confirm the purchase of the wireless device 20 to the correct network address 102. The wireless device 20, in other words, is requesting wireless access to the correct customer's wireless network 24.

FIG. 13 illustrates authorization. As the wireless device 20 matches the customer's wireless network 24, the server-side algorithm 92 confirms the purchase and authorizes retrieval of the corresponding security credentials 26. The security server 50 may then send the security message 60 directly to the corresponding network address 102 of the access device 62. The access device 62 (such as the wireless access router 64) may then accept the security credentials 26 via proxy authorization (as explained with reference to FIG. 3). Or, the access device 62 may forward route the security credentials 26 to the subnet mask IP address assigned to the wireless device 20. Regardless, the wireless device 20 is authorized for wireless access to the customer's wireless network 24. The access device 62 thus allows wireless access to the customer's wireless network 24, without additional or temporary pairing steps. However, if no database association matches the unique identifier (e.g., its SKU 34, model number 36, and/or serial number 38) of the electronic lock 22, then perhaps the purchase or identity cannot be confirmed or authenticated. Exemplary embodiments may decline automatic pairing, thus requiring manual configuration.

Figure 14:
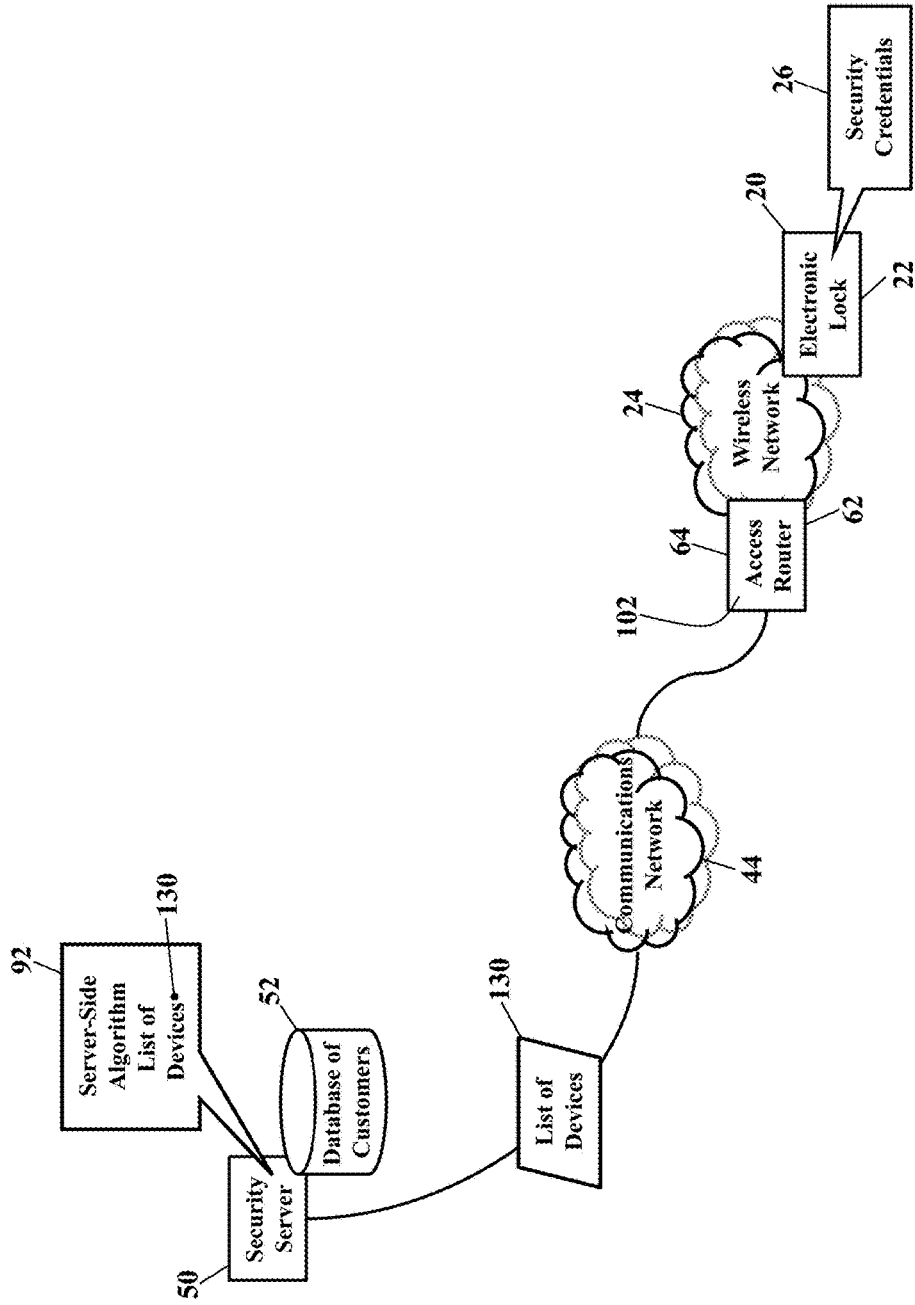
FIGS. 14-16 are more schematics further illustrating network access, according to exemplary embodiments.
Figure 15:
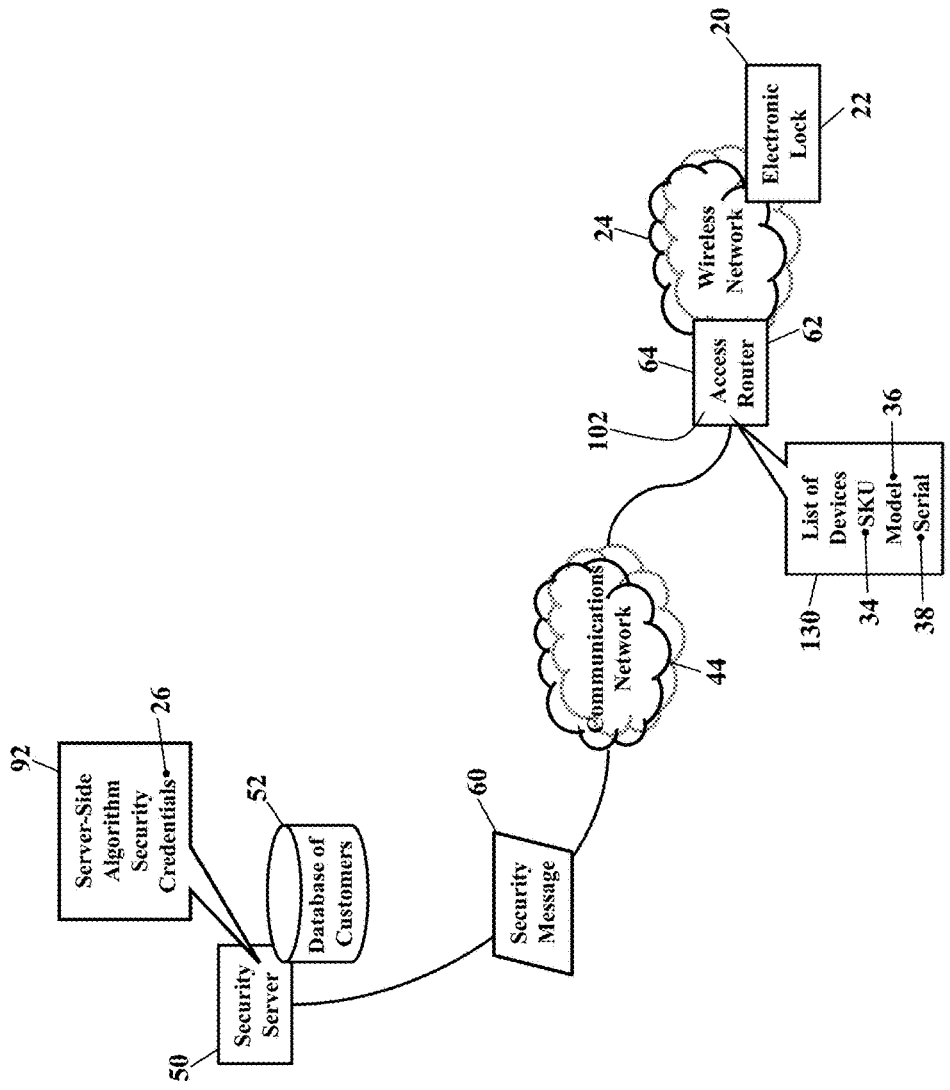
Figure 16:
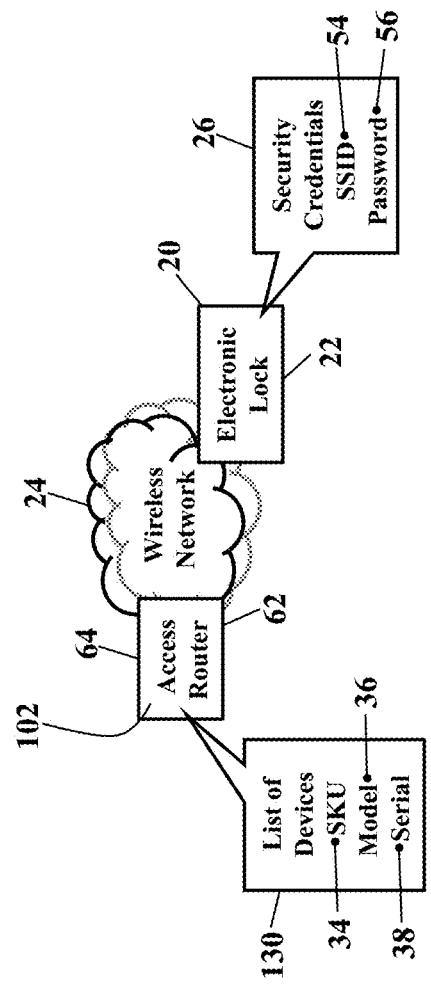

FIGS. 14-16 are more schematics further illustrating network access, according to exemplary embodiments. FIG. 14 illustrates a list 130 of devices that are permitted to access the customer's wireless network 24. The list 130 of devices may be generated by the security server 50, based on the purchase records logged in the database 52 of customers. As the customer purchases electronic devices, whether wired or wireless, those purchases may be tracked in the database 52 of customers (as earlier explained). The list 130 of devices may then be sent to any network address for access and use. FIG. 14, for example, illustrates the security server 50 sending the list 130 of devices into the communications network 44 for routing and delivery to the network address 102 associated with the customer's access device 62 (such as the wireless access router 64). FIG. 15, however, illustrates the list 130 of devices alternatively generated and maintained by the customer's access device 62. The access device 62 may update the list 130 devices with receipt of each security message 60 received from the security server 50. Regardless, the list 130 of devices may include or describe information of the wireless devices that are authorized to access the customer's wireless network 24. The list 130 of devices may thus be a log or "white" list of permitted devices. A wireless device not found in the list 130 of devices may be denied access. The list 130 of devices may contain entries for the different wired and wireless devices having access privileges, such as the SKU 34, the model number 36, and/or the serial number 38. Whenever the wireless device 20 requests access to the customer's wireless network 24, the list 130 of devices may thus already contain an entry authorizing access. The access device 62 may query the list 130 of devices for the SKU 34, the model number 36, and/or the serial number 38. If a match is determined, the access device 62 may automatically permit access, without requiring further information from the wireless device 20 (such as requiring a separate transmission of the security credentials 26). The customer, then, merely opens the box and powers up the wireless device 20. The wireless device 20 may thus be permitted access, based on the matching presence of its SKU 34, model number 34, and/or serial number 38 in the list 130 of devices.

FIG. 16 further illustrates the security credentials 26. If the requesting wireless device 20 is found on the list 130 of devices, then exemplary embodiments may still require submission of the security credentials 26. That is, even if the wireless device 20 is authorized by the security message 60, the access device 62 may still require submission of the security credentials 26 prior to granting access. So, should the requesting wireless device 20 be matched to the list 130 of devices, the access device 62 may then send the security credentials 26 in a packetized, electronic message to the wireless device 20. The access device 62 may assign a network address (e.g., subnet mask IP address) to the wireless device 20. The access device 62 sends the security credentials 26, thus allowing the wireless device 20 to return self-submit the security credentials 26, thus completing a formal access process or procedure. The wireless device 20 may thus submit the correct security credentials 26 (such as the SSID 54 and/or the network password 56) to formally request access to the customer's wireless network 24. Regardless, exemplary embodiments have thus automated the pairing process.

Exemplary embodiments thus present an automatic, customer-focused pairing solution. Convention pairing schemes require a cumbersome manual entry of the security credentials 26. Schemes are also known that require verbal submission of the security credentials 26. Exemplary embodiments, instead, add a layer of abstraction that obtains the newly purchased device characteristics (such as the SKU 34, the model number 34, the serial number 38, or device name) and relate this information to the purchasing customer's network configuration (derived from the unique information supplied by the customer's smartphone 112 or other cellular device). Further exemplary embodiments may await a provisioning file that is constructed and downloaded to the wireless device 20 when it is activated for the first time.

Automatic pairing may also be time based. Even if the wireless device 20 is automatically paired, exemplary embodiments may still require confirmation of the security credentials 26. For example, after some length of time (such as one week), exemplary embodiments may require formal submission of the security credentials 26. That is, even though the wireless device 20 may be matched to the list 130 of devices, the wireless access may be temporary. As an example, a timer may be invoked when the wireless device 20 is initially authorized for the customer's wireless network 24. The timer may be configured to count down or up from an initial value to a final value. When the timer expires, exemplary embodiments may deny further network access until the security credentials 26 are manually input. Exemplary embodiments may thus permit initial access and use for a limited period of time, but security concerns may still require submission of the security credentials 26 at a later date.

Exemplary embodiments thus provide a higher layer of provisioning. The electronic lock 22 (or any other wireless device 20) is uniquely identified and associated with the customer's account. Pairing may be entirely performed when the wireless device 20 is exposed to the customer's wireless network 24. The purchased wireless device 20, in other words, is usually purchased in a boxed or packaged "off," unpowered condition. However, when exposed to the purchasing customer's home or business network 24, exemplary embodiments may thus commence automatic pairing. Exemplary embodiments may thus obtain an electronic bar code scan of a product label and automatically pair to the purchasing customer's wireless network 24. However, if the wireless device 20 is electrically powered "on" at purchase, the wireless device 20 may still be paired to the purchasing customer's wireless network 24. The customer's security credentials 26, for example, may be pushed to the wireless device 20, even if exposed to a different network (such as a retail store's WI-FI network or a cellular network).

Figure 17:
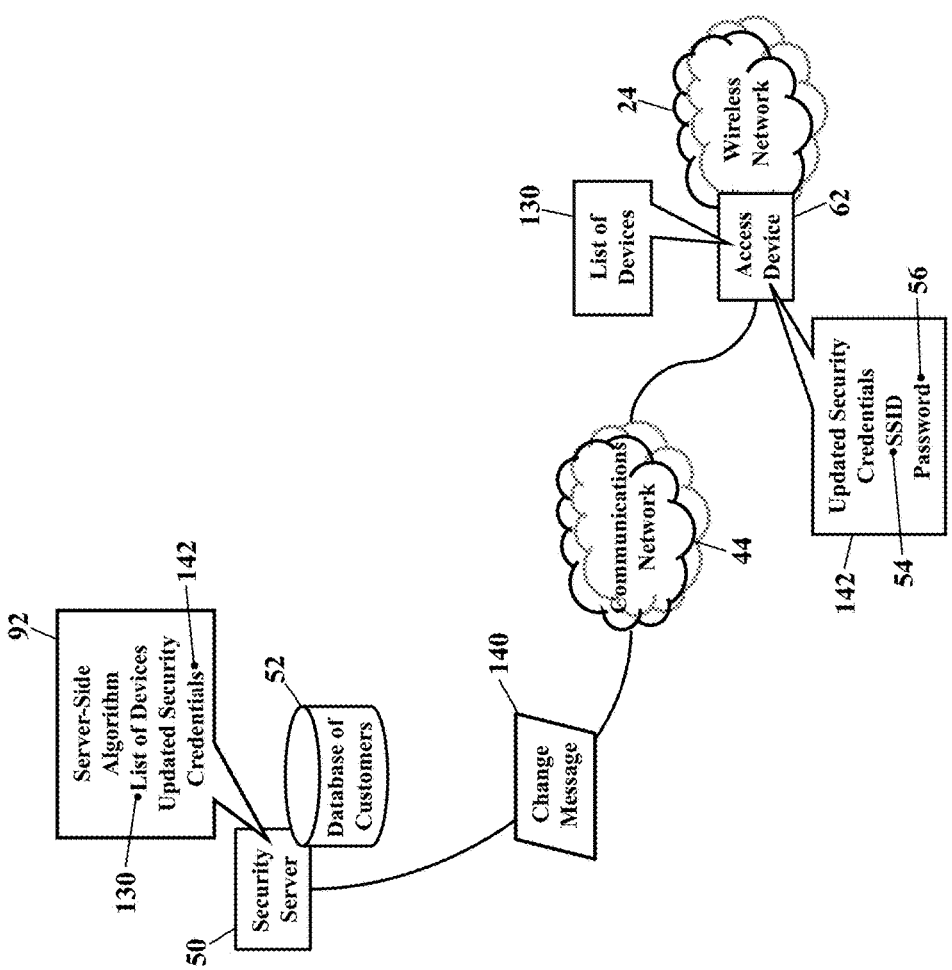
FIG. 17 is a schematic illustrating credential updates, according to exemplary embodiments.

FIG. 17 is a schematic illustrating credential updates, according to exemplary embodiments. As the reader may understand, some customers may periodically or randomly change their network password 56 (or other security credentials 26). This change would conventionally require reconfiguring each wireless device to the new security credentials 26. Exemplary embodiments, instead, may manage this change for the customer, thus implementing a global change. When the security credentials 26 change, the security server 50 may be notified. FIG. 17, for example, illustrates a packetized change message 140 sent to the security server 50. The change message 140 alerts the security server 50 to any change in the customer's security credentials 26. The change message 140, for example, may contain bits or bytes describing updated security credentials 142 (such as a change in the customer's SSID 54 or network password 56). While FIG. 17 illustrates the change message 140 sent from the access device 62, the change message 140 may be sent from any device or network address that is authorized to update the customer's security credentials 26. The change message 140 may cause the security server 50 to update the database 52 of customers with the new or updated security credentials 142. Moreover, the security server 50 and/or the access device 62 may also update or notify each device in the list 130 of devices with the new security credentials 26.

Figure 18:
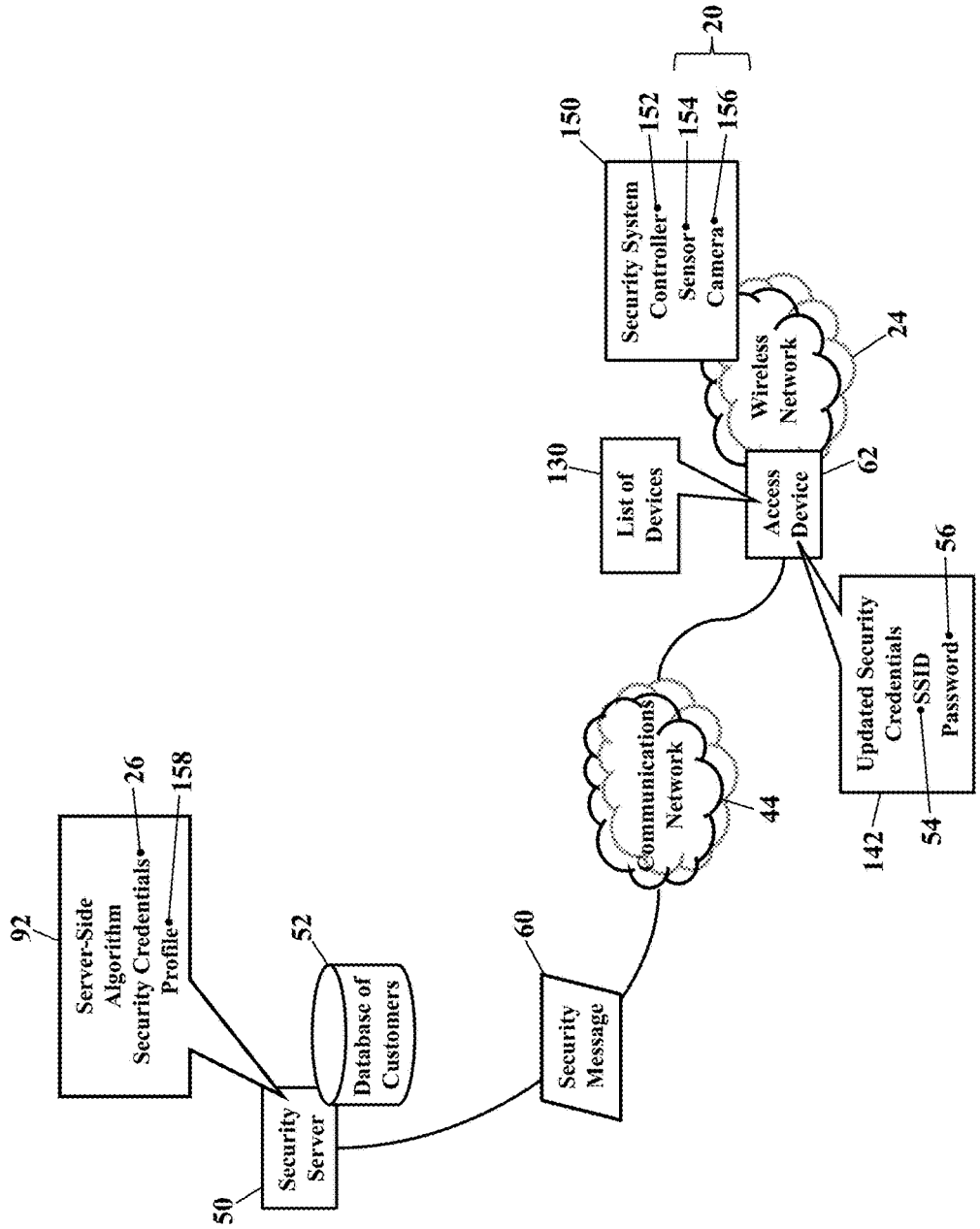
FIG. 18 is a schematic illustrating a security system, according to exemplary embodiments.
Figure 19:
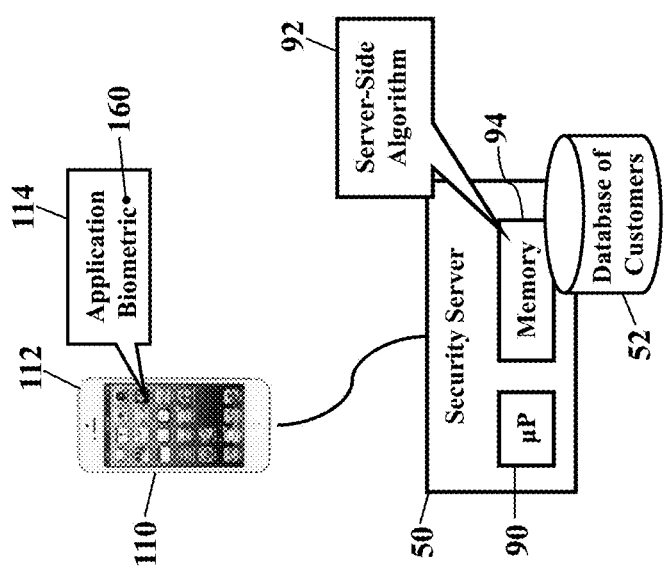
FIGS. 19-23 are schematics illustrating further security solutions, according to exemplary embodiments.

FIG. 18 is a schematic illustrating a security system 150, according to exemplary embodiments. Many homes and businesses have a security controller 152 that receives inputs from one or more sensors 154, cameras 156, and other security components. The security controller 152 monitors these inputs to determine alarm conditions, such as fire or intrusion alerts. Exemplary embodiments may thus be operationally integrated with the security system 150, thus further leveraging the provisioning knowledge maintained for profiling and security efforts. As FIG. 18 illustrates, here the security server 50 may store and maintain a very detailed profile 158 for each customer of the security system 150. The database 52 of customers, in other words, may be expanded to store and/or associate a rich profile description of each customer. As an example, the database 52 of customers may maintain the profile 158 of each customer of AT&T's DIGITAL LIFE® service. The profile 158 may thus store or associate security settings, HVAC settings, music and other content selections, specifications, and other detailed information regarding the customer's home or business, including the network security credentials 26. The network-connected security controller 152 may thus communicate with the security server 50, even receiving the security message 60 for automatic pairing of the wireless device 20, as above explained. The customer may thus purchase new or additional wireless sensors 154 and cameras 156 and have them automatically paired, as this disclosure explains.

FIGS. 19-23 are schematics illustrating further security solutions, according to exemplary embodiments. So far, mere possession of the customer's smartphone 112 may trigger automatic pairing to the customer's wireless network 24. That is, when the customer's smartphone 112 is used to purchase the wireless device 20, the wireless device 20 may be automatically paired to the customer's wireless network 24. While this automatic pairing is very convenient for the customer, automatic pairing may present security concerns. For example, if the customer's smartphone 112 is stolen, the thief could purchase a tablet computer and have it automatically paired, thus potentially providing nefarious network access to the thief. As the reader may understand, the thief may then have network access to the customer's sensitive electronic documents and information. Exemplary embodiments, then, may require a biometric input 160 to initiate or complete the pairing process. The security server 50, for example, may require a scan of a thumb or finger, thus confirming authentication of the true customer associated with the security credentials 26. If the security server 50 cannot confirm or match the biometric input 160, the automatic pairing may abandon or fail.

Figure 20:
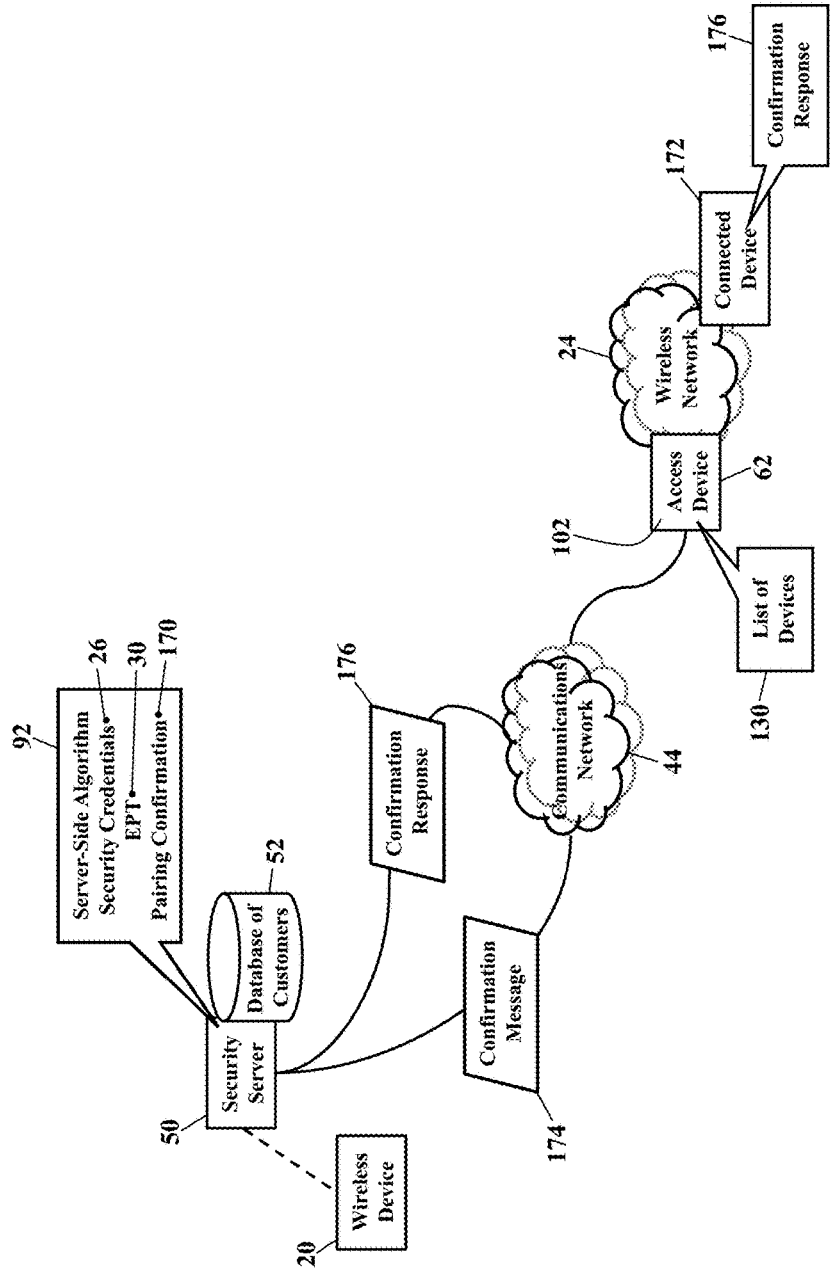

FIG. 20 illustrates a pairing confirmation 170. Even though the wireless device 20 has been purchased and perhaps automatically paired, some pairing confirmation 170 may still be required. As the above paragraph explains, nefarious activity could expose the customer's sensitive electronic documents and information. A confirmation process, for example, may be required using the customer's wireless network 24. Even though the customer may have purchased the wireless device 20, exemplary embodiments may require the pairing confirmation 170 before automatic pairing begins or completes. Here, then, the pairing confirmation 170 may require a permitted device in the customer's wireless network 24. That is, a connected device 172, using the customer's own wireless network 24, may be used for the pairing confirmation 170.

FIG. 20 illustrates one such confirmation. When the security server 50 is notified of the electronic purchase transaction (or "EPT") 30, the security server 50 may generate a confirmation message 174. The confirmation message 174 is packetized and sent to the network address 102 associated with the security credentials 26 (known from the database association in the database 52 of customers, as above explained). FIG. 20 illustrates the confirmation message 174 routing to the customer's access device 62 in her wireless network 24. When the access device 62 receives the confirmation message 174, the access device 62 may consult the list 130 of devices. The list of devices may be the "white" list of devices that are permitted access to the customer's wireless network 24. The access device 62 may then broadcast or forward the confirmation message 174 into the customer's wireless network 24 to any one of the devices or network addresses contained in the list 130 of devices.

One of the connected devices 172 may then generate a confirmation response 176. That is, the pairing confirmation 170 may require confirmation from a device in the list 130 of devices that is currently interfaced with, and reachable using, the customer's wireless network 24. The access device 62 may then forward the confirmation response 176 into the communications network 24 for routing and delivery to the security server 50. If the confirmation response 176 confirms the pairing, then automatic pairing may proceed. However, if the confirmation response 176 denies the pairing, then exemplary embodiments may decline automatic pairing of the recently purchased wireless device 20. Exemplary embodiments may thus reject or delete the database association in the database 52 of customers. Additionally, if the access device 62 fails to receive the confirmation response 176, the access device 62 may retry or simply abandon. Exemplary embodiments, then, may require the pairing confirmation 170 prior to final acceptance of the automatic pairing, thus perhaps thwarting potentially nefarious activity.

Figure 21:
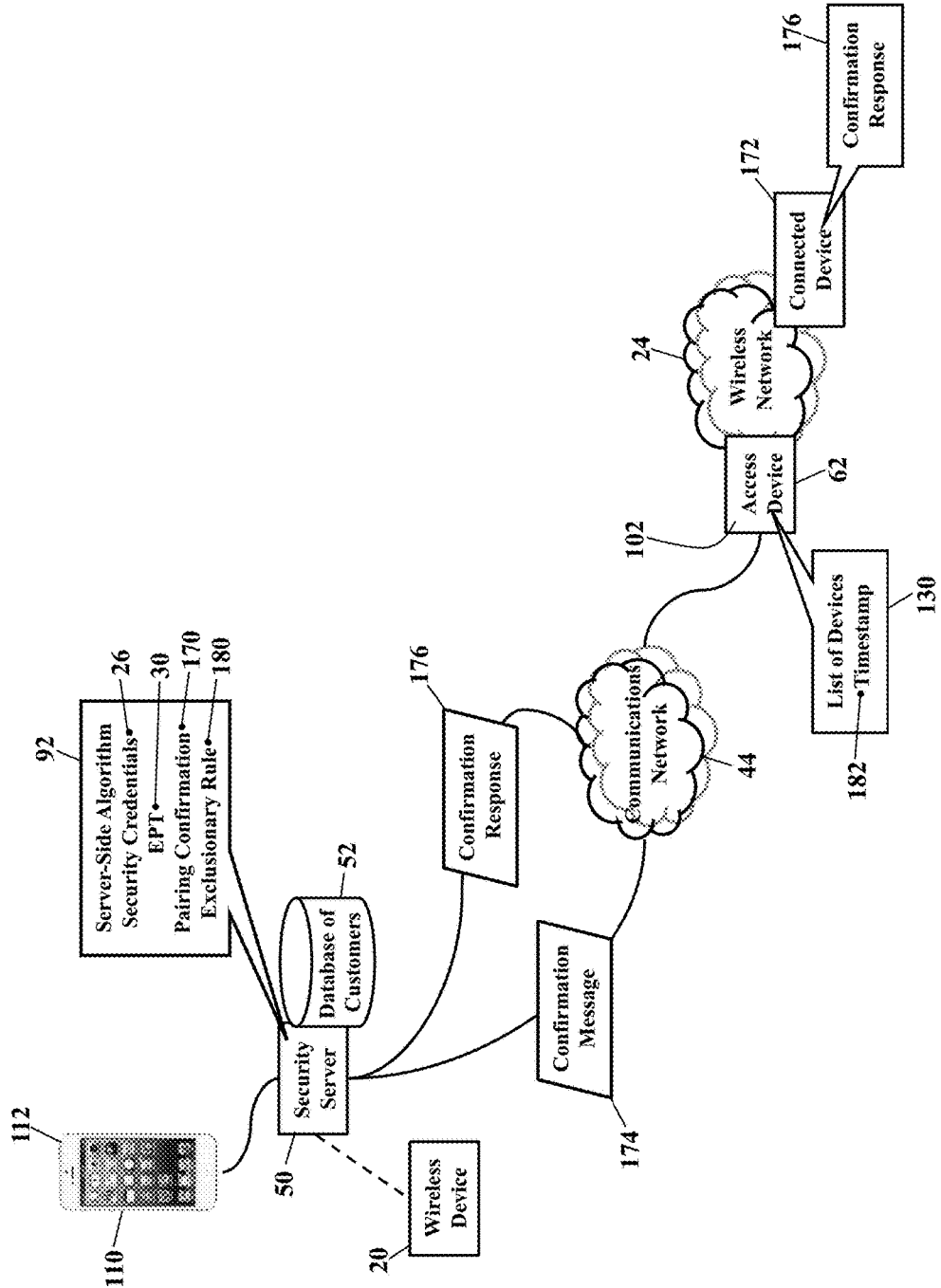

FIG. 21 illustrates one or more exclusionary rules 180. As the above paragraphs explain, nefarious activity could expose the customer's sensitive electronic documents and information. If the customer's smartphone 112 is stolen, the thief could make purchases and have nearly immediate access to the customer's wireless network 24. Electronic documents and sensitive information may thus be vulnerable. Exemplary embodiments may thus include additional or alternative security precautions, such as the exclusionary rule 180. For example, the pairing confirmation 170 may require confirmation from one of the other "older" or existing connected devices 172 in the list 130 of devices. That is, exemplary embodiments may exclude the newly purchased wireless device 20 from the pairing confirmation 170. The confirmation message 174 may thus not be sent into the wireless network 24 for delivery to the newly purchased wireless device 20. Instead, the confirmation message 174 is only sent or addressed to existing or older entries in the list 130 of devices. Each entry in the list 130 of devices may thus be associated with a timestamp 182. The timestamp 182 may represent any date and time, such as an original date/time of first access or any previous, historical access to the wireless network 24. Exemplary embodiments may thus select any one or all of the "older" or existing connected devices 172 from which the confirmation response 176 must or may be received. So, not only must the confirmation response 176 be performed using the residential or business wireless network 24, but exemplary embodiments may also exclude the newly purchased wireless device 20 from the pairing confirmation 170. The thief may thus be prevented from using the newly purchased wireless device 20 to access the wireless network 24.

Figure 22:
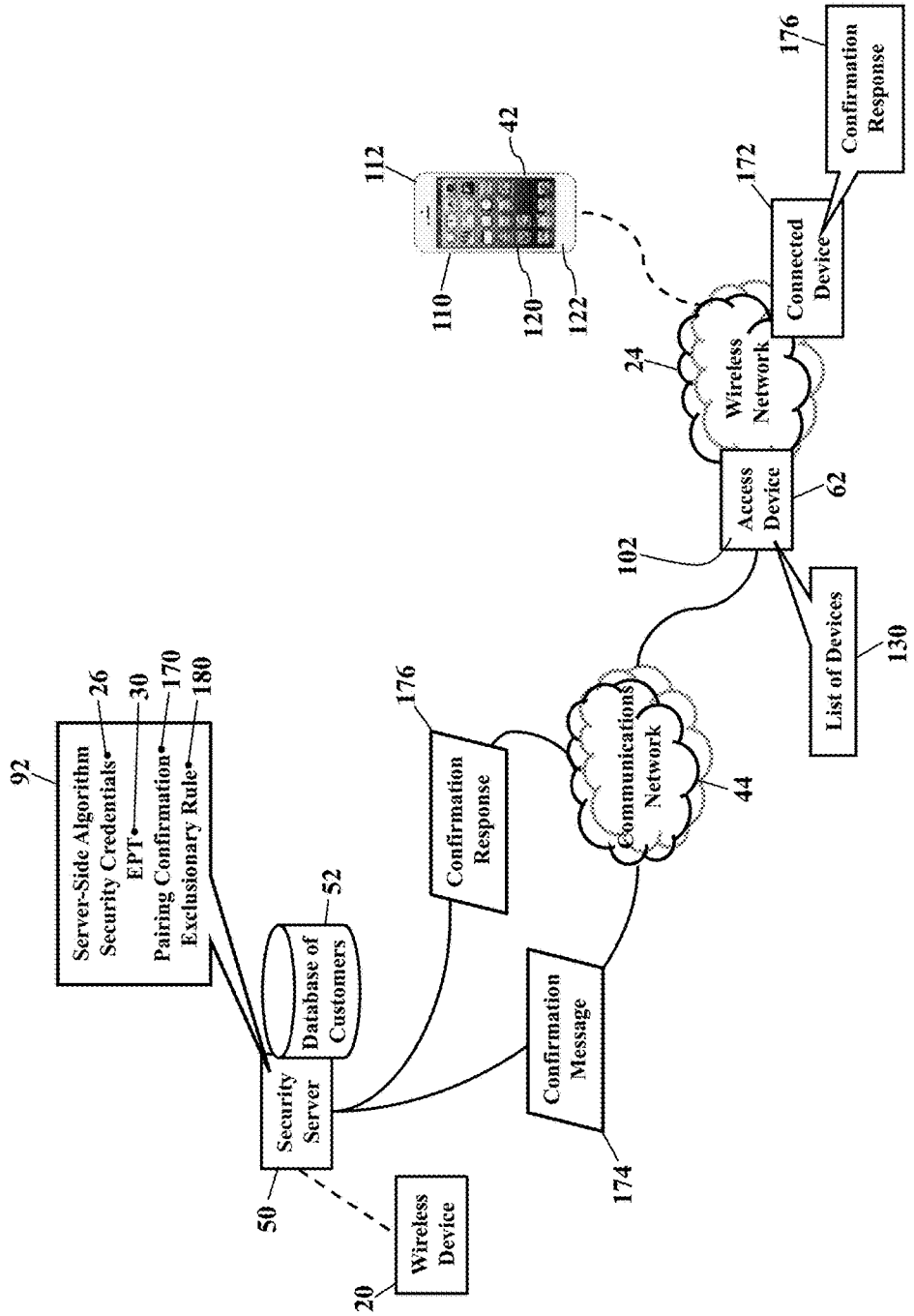

FIG. 22 illustrates another exclusion. Exemplary embodiments may exclude the purchasing device from the pairing confirmation 170. That is, whatever device was used to participate in the electronic purchase transaction 30, that same device may be excluded from confirming the automatic pairing of the newly purchased wireless device 20. Suppose, for example, that the electronic purchase transaction 30 was conducted using the smartphone 112. As a result, the electronic purchase transaction 30 may identify the cellular telephone number 42, IMSI 120, and/or or MSISDN 122 used to make the purchase. When the security server 50 is notified of the electronic purchase transaction 30, exemplary embodiments may then exclude that same smartphone 112 from the pairing confirmation 170. The security server 50 may generate the confirmation message 174 with information or content identifying the purchasing device (perhaps using the cellular telephone number 42, IMSI 120, and/or or MSISDN 122). When the access device 62 receives the confirmation message 174, the access device 62 may then exclude the purchasing device from the confirmation message 174. That is, the confirmation message 174 may not be sent or addressed to the smartphone 112 described in the electronic purchase transaction 30. The confirmation response 176 may also be excluded from the smartphone 112 described in the electronic purchase transaction 30. Exemplary embodiments may thus force the pairing confirmation 170 to exclude the cellular telephone number 42, IMSI 120, and/or or MSISDN 122 or network address associated with the purchasing device. The thief, then, cannot use the user's stolen smartphone 112 to confirm the automatic pairing of the newly purchased wireless device 20.

Exemplary embodiments may further exclude other networks from the pairing confirmation 170. The exclusionary rule 180 may have configuration settings in which a user specifies whether or not the residential or business WI-FI wireless network 24 is solely required for the pairing confirmation 170. Exemplary embodiments, in other words, may exclude a cellular or BLUETOOTH® network connection from confirming the automatic pairing. Again, then, this exclusion may also prevent the thief from using the stolen smartphone 112 to confirm the automatic pairing of the newly purchased wireless device 20. Exemplary embodiments may thus force the pairing confirmation 170 to use the customer's wireless network 24 as a further security precaution.

Exemplary embodiments may thus implement any one or combination of exclusions. Confirmation rules or settings may exclude the newly purchased wireless device 20 from the pairing confirmation 170. Exemplary embodiments may additionally or alternatively exclude the purchasing device, such as the smartphone 112. Exemplary embodiments may additionally or alternatively exclude any wide area and/or local area networks. Exemplary embodiments may thus force the pairing confirmation 170 to use the wireless network 24 as a further security precaution. The pairing confirmation 170 may also require use of a trusted one of the devices in the list 130 of devices. Any one, combination, or all of the security precautions may thwart nefarious access.

Figure 23:
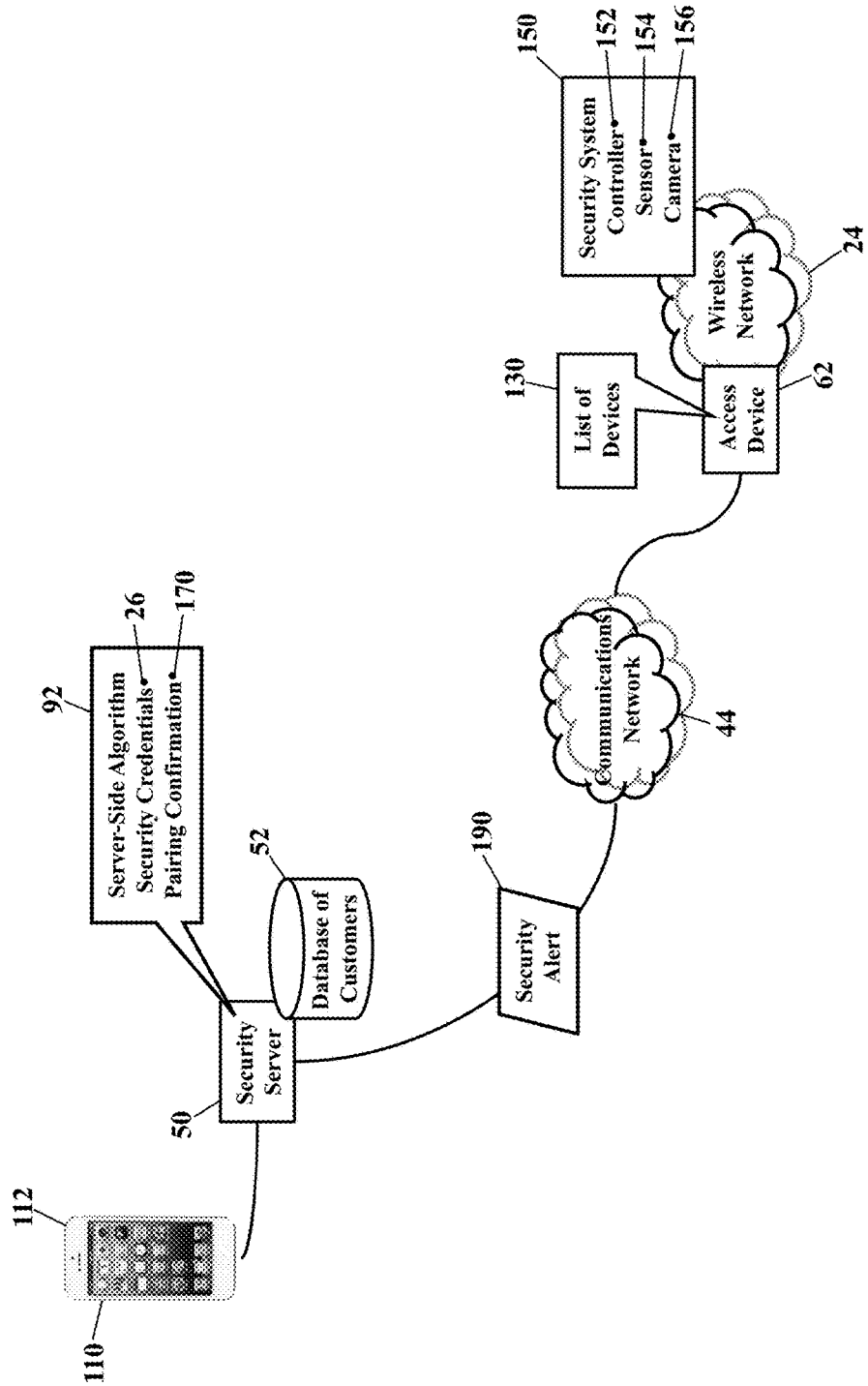

FIG. 23 illustrates further security precautions. As exemplary embodiments may seamlessly integrate with the security system 150, additional features may be exploited to thwart nefarious access. For example, suppose the pairing confirmation 170 is attempted from a device or address not matched to the list 130 of devices. Exemplary embodiments may then command or instruct the security system 150 to begin capturing or storing video from a security camera. Indeed, if the attempted or failed confirmation is detected using the customer's wireless network 24, then perhaps a thief is in or near the home or business. Video output may thus help document and identify the thief. The security server 50 may thus send a security alert 190 to the security system 150, instructing or commanding the security system 150 to receive and store video data from the security camera 156. Moreover, exemplary embodiments may also generate and/or send notifications to one or more notification addresses, with each one of the notifications (e.g., text messages or emails) alerting to the attempted confirmation and/or a possible intrusion. Indeed, exemplary embodiments may be used to predict physical intrusion, based on a failed attempt to confirm the automatic pairing. As a thief may have possession of the stolen smartphone 112 (or other device), the thief likely knows a street address and perhaps even electronic keys, codes, credit card numbers, and other sensitive information. Friends and family may also be compromised, based on contact information stored in the smartphone 112. Exemplary embodiments may thus similarly send electronic notifications to network addresses of contacts stored in the smartphone 112. Other security systems, then, may predict nefarious activity and even physical intrusion, based on receipt of a notification. Exemplary embodiments may further alert police and other emergency officials to predicted intrusions and/or nefarious network access. Moreover, if the pairing confirmation 170 fails, the security server 50 may send a location command to the purchasing device and/or the recently purchased wireless device 20, instructing either device to activate a global positioning system and report its current GPS location. Any one, combination, or all of these security precautions may further thwart nefarious access.

Figure 24:
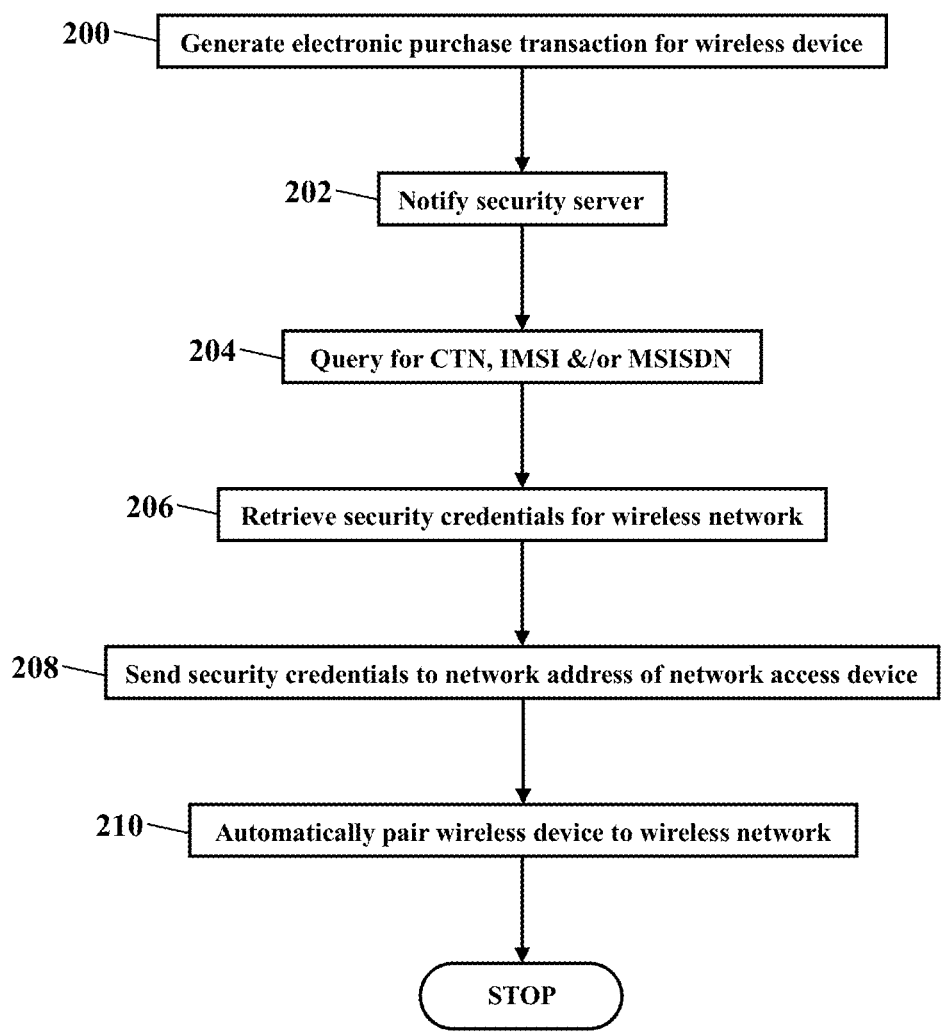
FIG. 24 is a flowchart illustrating an algorithm for automatic pairing, according to exemplary embodiments.

FIG. 24 is a flowchart illustrating an algorithm for automatic pairing, according to exemplary embodiments. The electronic purchase transaction 30 is generated (Block 200). The security server 50 is notified of the electronic purchase transaction 30 (Block 202). A query is made for the cellular telephone number ("CTN") 42, IMSI 120, and/or or MSISDN 122 (Block 204). The corresponding security credentials 26 are retrieved (Block 206) and sent to the corresponding network address 102 (Block 208). The security credentials 26 are used to automatically pair a wireless device to the wireless network 24 (Block 210).

Figure 25:
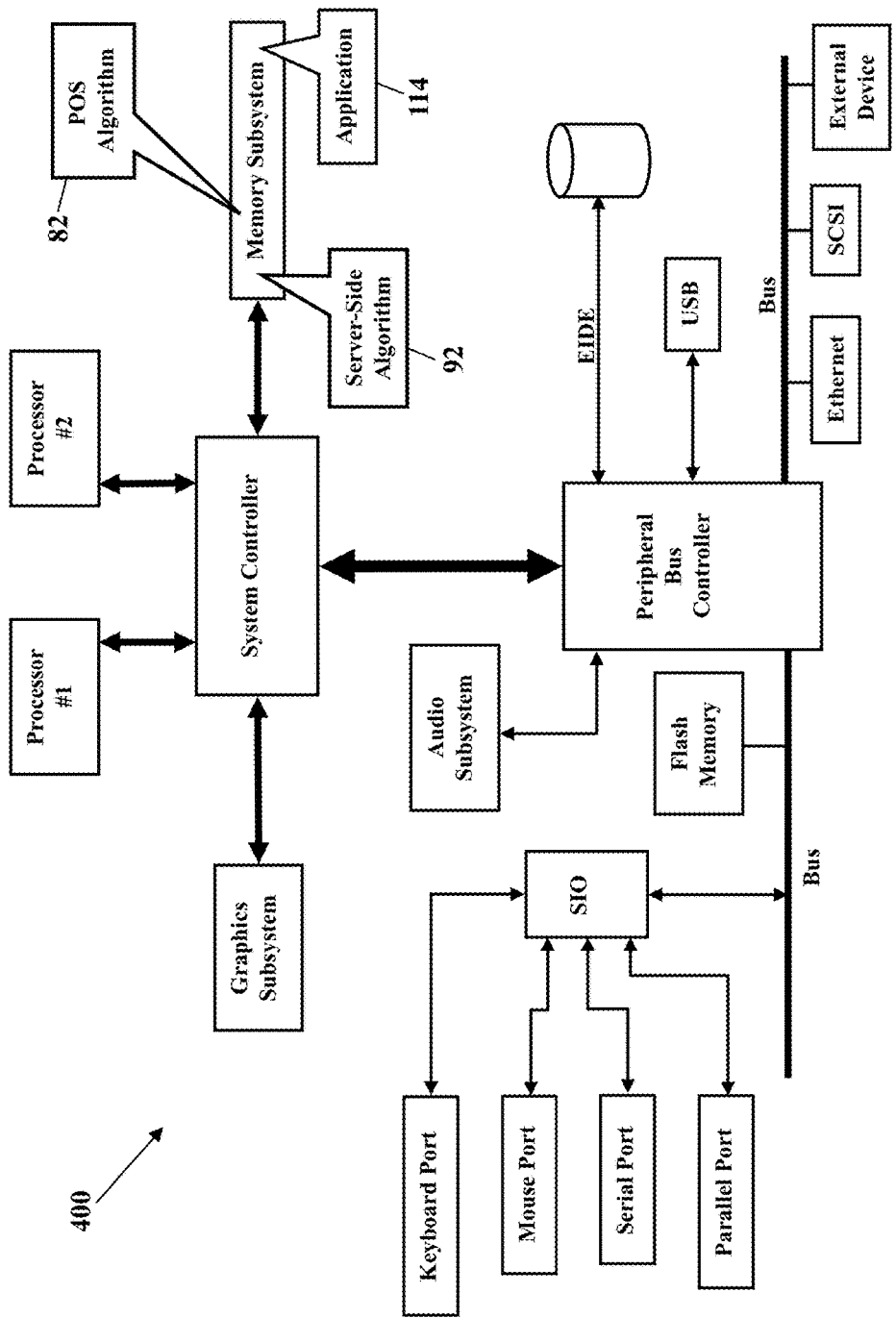

FIG. 25 is a schematic illustrating still more exemplary embodiments. FIG. 25 is a more detailed diagram illustrating a processor-controlled device 400. As earlier paragraphs explained, the POS algorithm 82, the server-side algorithm 92, and/or the algorithm 114 may partially or entirely operate in any mobile or stationary processor-controlled device. FIG. 25, then, illustrates the POS algorithm 82, the server-side algorithm 92, and/or the algorithm 114 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

FIG. 26 depicts other possible operating environments for additional aspects of the exemplary embodiments. FIG. 26 illustrates the POS algorithm 82, the server-side algorithm 92, and/or the algorithm 114 operating within various other processor-controlled devices 400. FIG. 26, for example, illustrates that the POS algorithm 82, the server-side algorithm 92, and/or the algorithm 114 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing any of the processors above described and/or a digital signal processor (DP/DSP) 414. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for automatic pairing, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
   a hardware processor; and
   a memory device, the memory device storing instructions, the instructions when executed causing the hardware processor to perform operations, the operations comprising:
   receiving a cellular identifier associated with a device used to conduct a purchase of a wireless device;
   querying billing records for the cellular identifier, the billing records electronically associating cellular identifiers to security credentials associated with wireless local area networks;
   identifying the security credentials in the billing records that are electronically associated with the cellular identifier associated with the device; and
   sending a message to a network access device, the message specifying the security credentials identified in the billing records, the message authorizing a pairing of the wireless device to a wireless local area network of the wireless local area networks;
   wherein the wireless device is paired to the wireless local area network associated with the security credentials.

2. The system of claim 1, wherein the operations further comprise identifying a network address associated with the network access device.

3. The system of claim 1, wherein the operations further comprise processing an electronic purchase transaction associated with the wireless device.

4. The system of claim 1, wherein the operations further comprise identifying a credit card number associated with the device conducting the purchase of the wireless device.

5. The system of claim 1, wherein the operations further comprise identifying a credit card number in the billing records that is electronically associated with the cellular identifier.

6. The system of claim 1, wherein the operations further comprise retrieving a service set identifier that is electronically associated with the cellular identifier.

7. The system of claim 1, wherein the operations further comprise retrieving a network password that is electronically associated with the cellular identifier.

8. A method, comprising:
   receiving, by a server, a cellular identifier associated with a device used to conduct a purchase of a wireless device;
   querying, by the server, billing records for the cellular identifier, the billing records electronically associating cellular identifiers to security credentials associated with wireless local area networks;
   identifying, by the server, the security credentials in the billing records that are electronically associated with the cellular identifier associated with the device; and
   sending, by the server, a message to a network access device, the message specifying the security credentials identified in the billing records, the message authorizing a pairing of the wireless device to a wireless local area network of the wireless local area networks;
   wherein the wireless device is paired to the wireless local area network associated with the security credentials.

9. The method of claim 8, further comprising identifying a network address associated with the network access device.

10. The method of claim 8, further comprising processing an electronic purchase transaction associated with the device conducting the purchase of the wireless device.

11. The method of claim 8, further comprising identifying a credit card number associated with the device conducting the purchase of the wireless device.

12. The method of claim 8, further comprising identifying a credit card number in the billing records that is electronically associated with the cellular identifier.

13. The method of claim 8, further comprising retrieving a service set identifier that is electronically associated with the cellular identifier.

14. The method of claim 8, further comprising retrieving a network password that is electronically associated with the cellular identifier.

15. A memory device storing instructions that when executed cause a hardware processor to perform operations, the operations comprising:
   receiving a credit card number associated with a device used to conduct a purchase of a wireless device;
   querying billing records for the credit card number, the billing records electronically associating credit card numbers to security credentials associated with wireless local area networks;
   identifying the security credentials in the billing records that are electronically associated with the credit card number associated with the device; and
   sending a message to a network access device, the message specifying the security credentials identified in the billing records, the message authorizing a pairing of the wireless device to a wireless local area network of the wireless local area networks;
   wherein the wireless device is paired to the wireless local area network associated with the security credentials.

16. The memory device of claim 15, wherein the operations further comprise identifying a network address associated with the network access device.

17. The memory device of claim 15, wherein the operations further comprise processing an electronic purchase transaction associated with the device conducting the purchase of the wireless device.

18. The memory device of claim 15, wherein the operations further comprise retrieving a service set identifier that is electronically associated with the credit card number.

19. The memory device of claim 15, wherein the operations further comprise retrieving a network password that is electronically associated with the credit card number.

20. The memory device of claim 15, wherein the operations further comprise confirming the pairing of the wireless device to the wireless local area network.

* * * * *